US011041736B2

(12) United States Patent
Sakr et al.

(10) Patent No.: US 11,041,736 B2
(45) Date of Patent: Jun. 22, 2021

(54) GENERATING REAL-TIME HIGH-DEFINITION (HD) MAPS USING WIRELESS VEHICLE DATA OF A REMOTE VEHICLE

(71) Applicant: TOYOTA JIDOSHA KABUSHIKI KAISHA, Toyota (JP)

(72) Inventors: Ahmed Sakr, Mountain View, CA (US); Gaurav Bansal, Mountain View, CA (US)

(*) Notice: Subject to any disclaimer, the term of this patent is extended or adjusted under 35 U.S.C. 154(b) by 343 days.

(21) Appl. No.: 16/137,375

(22) Filed: Sep. 20, 2018

(65) Prior Publication Data

US 2020/0096359 A1 Mar. 26, 2020

(51) Int. Cl.
| G01C 21/36 | (2006.01) |
| G01C 21/34 | (2006.01) |
| G01S 19/45 | (2010.01) |
| G05D 1/02 | (2020.01) |
| G05D 23/00 | (2006.01) |

(52) U.S. Cl.
CPC ..... *G01C 21/3676* (2013.01); *G01C 21/3446* (2013.01); *G01C 21/3688* (2013.01); *G01C 21/3694* (2013.01); *G01S 19/45* (2013.01); *G05D 1/0212* (2013.01); *G05D 1/0278* (2013.01); *G05D 2201/0213* (2013.01)

(58) Field of Classification Search
CPC ............ G01C 21/3676; G01C 21/3446; G01C 21/3694; G05D 1/0212; G05D 1/0278; G05D 2201/0213; G01S 19/45; G01S 7/4972

USPC .......................................... 701/423, 300, 102
See application file for complete search history.

(56) References Cited

U.S. PATENT DOCUMENTS

| 2012/0022764 | A1* | 1/2012 | Tang | B60W 30/1882 |
| | | | | 701/102 |
| 2012/0089319 | A1* | 4/2012 | Basnayake | G01S 19/03 |
| | | | | 701/300 |
| 2018/0197414 | A1* | 7/2018 | Oooka | B62D 15/025 |
| 2019/0120948 | A1* | 4/2019 | Yang | G01S 17/931 |
| 2019/0130753 | A1* | 5/2019 | Graham | G08G 1/161 |

FOREIGN PATENT DOCUMENTS

JP        PO2008-003417        1/2008

* cited by examiner

*Primary Examiner* — Mahmoud S Ismail
(74) *Attorney, Agent, or Firm* — Burbage Law, P.C.; Jon-Michael Burbage; Elizabeth Ruzich

(57) ABSTRACT

The disclosure includes embodiments for generating a real-time high-definition (HD) map for an ego vehicle using wireless vehicle data of a remote vehicle. In some embodiments, a method includes receiving a V2X wireless message which includes remote GPS data and remote road parameter data of the remote vehicle. The method includes retrieving ego GPS data of the ego vehicle. The method includes generating ego road parameter data describing an initial estimate of a geometry of a road on which the ego vehicle is located. The method includes fusing the ego road parameter data and the remote road parameter data to form fused road parameter data which describes an improved estimate of the geometry of the road that is more accurate than the initial estimate. The method includes generating a real-time HD map based on the remote GPS data, the ego GPS data, and the fused road parameter data.

20 Claims, 11 Drawing Sheets

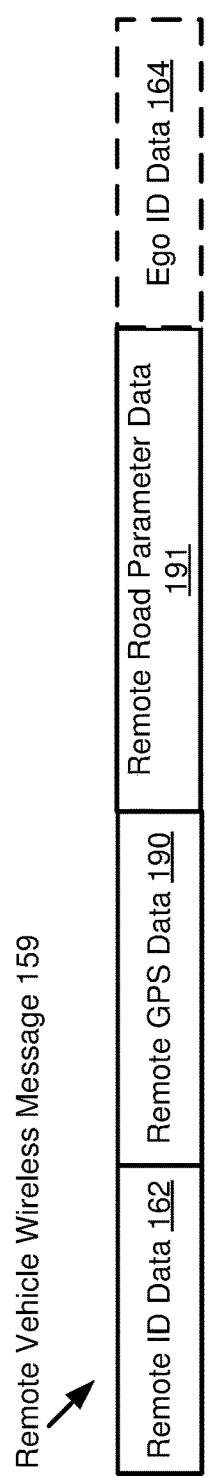
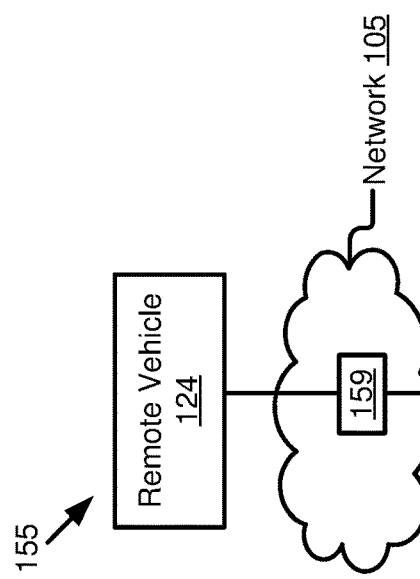
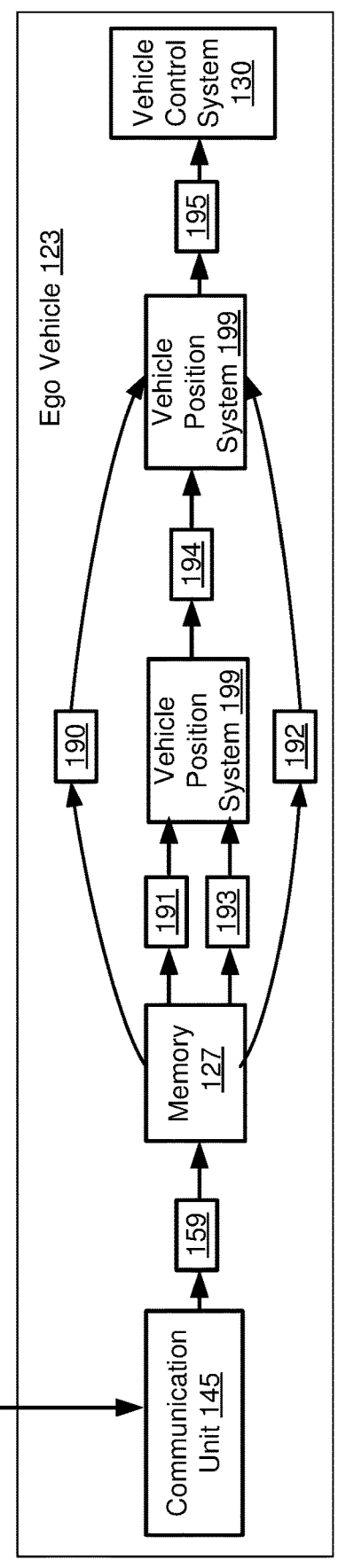

BSM DATA 800

- Vehicles and other client devices equipped with Dedicated Short Range Communication (DSRC) transmit a Basic Safety Message (BSM) at a regular interval.

- Each BSM includes the following BSM data describing one or more of the following for the vehicle that originally sent the BSM:
    (1) Location Data Describing the Location of the Vehicle, where the Location Data may be so accurate that it describes the specific lane the Vehicle is traveling in;
    (2) Heading Data Describing the Direction of travel for the Vehicle;
    (3) Velocity Data Describing the Velocity of the Vehicle; and
    (4) Path History of Vehicle (e.g., path history data).

Figure 8A

BSM DATA 800

Part 1
Vehicle Position Data (local 3D)
- Latitude
- Longitude
- Elevation
- Positional accuracy
- Time Vehicle Motion Data
- Transmission state
- Speed
- Heading
- Steering wheel angle
- Acceleration set (4-way, i.e., 3 axes of acceleration plus yaw rate
- Brake system status Vehicle Size Data

Part 2
Vehicle Path History
Future Vehicle Path Estimation
Hard Active Braking
Traction Control System active over 100 milliseconds?
Antilock Brake System active over 100 milliseconds?
Light Status
Wiper Status
Vehicle type

Figure 8B

GENERATING REAL-TIME HIGH-DEFINITION (HD) MAPS USING WIRELESS VEHICLE DATA OF A REMOTE VEHICLE

BACKGROUND

The specification relates to generating real-time high-definition (HD) maps for an ego vehicle using wireless vehicle data of a remote vehicle. For example, the real-time HD maps are generated by the ego vehicle using sensor measurements (e.g., camera measurements) recorded by the ego vehicle of the remote vehicle that is nearby (e.g., within sensor range of the ego vehicle) the ego vehicle.

There is a growing need in vehicular design for real-time HD maps. State-of-the-art systems for building real-time maps using onboard sensors do not always provide sufficient accuracy. Vehicle-lane-change detection methods rely on accurate real-time maps. As a result, the vehicle-lane-change detection methods suffer from inaccuracy, which present a safety risk. More accurate mapping technologies are needed.

Some existing solutions for determining lane changes of a vehicle use gating for some predefined threshold or probabilistic estimation using interacting multiple model (IMM) filters. These techniques are known to have high errors and as much as 50% false alarm rates.

SUMMARY

Described are embodiments of a vehicle position system that is an element of a connected vehicle. The vehicle position system beneficially solves the problems of inaccurate map generation and incorrect vehicle-lane-change detection by: using wireless vehicle data received from a remote vehicle via vehicle-to-everything (V2X) communication to improve generation of a real-time HD map on an ego vehicle; and then using the real-time HD map to detect a lane change of the remote vehicle.

In some embodiments, a roadway environment includes at least two vehicles: the ego vehicle; and the remote vehicle. The vehicle position system improves the accuracy of generating real-time maps for the ego vehicle as well as detecting lane changes of the remote vehicle using wireless vehicle data received from the remote vehicle that includes road parameters. The ego vehicle is located on a roadway within a communication range of the remote vehicle.

The ego vehicle and the remote vehicle (as well as other computing devices) are equipped with a Global Positioning System (a "GPS" if referenced generally, or a "GPS unit" if in reference to a specific device). A GPS unit may wirelessly communicate with one or more GPS satellites to ascertain GPS data. The GPS data is data associated with the GPS unit and received from the one or more GPS satellites. The GPS data describes a geographic position of the vehicle which includes the GPS unit.

The remote vehicle tracks its own position using a GPS unit to form "remote GPS data" and uses camera sensors to measure road parameters. The remote vehicle transmits a wireless message to the ego vehicle that includes the remote GPS data and road parameters (e.g., a lateral offset) described by remote road parameter data. This wireless message is transmitted via Dedicated Short-Range communication (DSRC), Long Term Evolution Vehicle-to-Everything (LTE-V2X), or some other form of wireless communication.

The ego vehicle tracks its own position using a GPS unit to form "ego GPS data" and generates its own estimation of a road geometry (e.g., the road geometry being described by ego road parameter data) using its onboard sensors. The ego vehicle fuses the remote GPS data and the road parameters from the remote vehicle with the ego GPS data and its own estimation of road geometry to generate an HD map. This "fusing" may be achieved by Kalman filtering or some other fusing technique.

There is no existing solution that receives remote road parameter data from the remote vehicle via V2X communication, fuses the remote road parameter data to ego road parameter data of the ego vehicle to arrive at a more accurate description of road parameter data (e.g., fused road parameter data), and then uses the fused road parameter data to create a real-time HD map for more accurately tracking lane changes of the remote vehicle. For example, existing solutions suffer from as much as 50% false alarm rates at least because the existing solutions fail to take advantage of data included as the payload for DSRC messages or Basic Safety Messages ("BSM" if singular, "BSMs" if plural).

A benefit of the vehicle position system described herein includes that it provides a way to use technologies that is becoming widely adapted in vehicles to help improve the accuracy of real-time HD maps that, in turn, improve the accuracy of vehicle-lane-change detection methods (and thereby decrease the false alarm rates). An additional benefit of the vehicle position system includes that it may be used to improve the safety of an Advanced Driver Assistance System ("ADAS system" if singular, "ADAS systems" if plural) in vehicles for autonomous driving. Other advantages of the vehicle position systems are possible.

As used herein, the words "geographic location," "location," "geographic position" and "position" refer to a latitude and longitude of an object such as the ego vehicle or the remote vehicle. The example embodiments described herein provide positioning information that describes a geographic position of a vehicle with an accuracy of at least plus or minus 1.5 meters in relation to the actual geographic position of the vehicle. Accordingly, the example embodiments described herein are able to describe the geographic position of the vehicle with lane-level accuracy or better.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method for an ego vehicle including a Global Positioning System (GPS) unit, including: receiving a Vehicle-to-Anything (V2X) wireless message from a network, where the V2X wireless message includes remote GPS data and remote road parameter data generated by a remote vehicle; retrieving ego GPS data from the GPS unit of the ego vehicle; generating ego road parameter data describing an initial estimate of a geometry of a road on which the ego vehicle is located; fusing the ego road parameter data and the remote road parameter data to form fused road parameter data, where the fused road parameter data describes an improved estimate of the geometry of the road that is more accurate than the initial estimate; and generating high-definition (HD) map data describing a real-time HD map based on the remote GPS data, the ego GPS data and the fused road parameter data. Other embodiments of this aspect include corresponding computer systems, apparatus, and computer programs recorded on one or more computer storage devices, each configured to perform the actions of the methods.

Implementations may include one or more of the following features. The method where the ego vehicle further includes a vehicle control system and the method further includes: inputting the HD map data to the vehicle control system to improve accuracy of a vehicle tracking technique controlled by the vehicle control system; and executing the vehicle tracking technique based on the HD map data to track movement of the remote vehicle. The method where the vehicle tracking technique is a vehicle-lane-change detection technique and executing the vehicle tracking technique based on the HD map data includes: executing the vehicle-lane-change detection technique to detect a lane change of the remote vehicle based on the HD map data. The method where inputting the HD map data to the vehicle control system includes modifying an operation of the vehicle control system based on the HD map data so that the vehicle control system controls an operation of the ego vehicle based on the HD map data. The method where the vehicle control system includes one of an Advanced Driver Assistance System (ADAS system) and an autonomous driving system. The method where the V2X wireless message further includes path history data describing multiple path history points of the remote vehicle, the remote road parameter data includes a lateral offset of the remote vehicle from a center of a reference lane, and generating the HD map data describing the real-time HD map further includes: generating one or more interpolated points based on the multiple path history points, where a lateral offset for each of the one or more interpolated points is estimated based on the lateral offset of the remote vehicle; and generating a path of the remote vehicle on the HD map based on the multiple path history points and the one or more interpolated points. The method where the remote road parameter data further includes one or more of a relative heading of the remote vehicle, curvature of the reference lane, and a curvature change rate of the reference lane. The method where the real-time HD map provides an estimate of a position of the remote vehicle that is accurate within plus or minus half a width of a lane on the road. The method where the remote GPS data describes a geographical location of the remote vehicle, and the ego GPS data describes a geographical location of the ego vehicle. The method where the fusing is achieved by Kalman filtering. The method where the V2X wireless message is selected from a group that consists of: a DSRC message; a BSM; a Long-Term Evolution (LTE) message; an LTE-V2X message; a 5G-LTE message; and a millimeter wave message (mmWave message). Implementations of the described techniques may include hardware, a method or process, or computer software on a computer-accessible medium.

One general aspect includes a system including a GPS unit of an ego vehicle and an onboard vehicle computer system that is communicatively coupled to the GPS unit, the onboard vehicle computer system including a non-transitory memory storing computer code which, when executed by the onboard vehicle computer system, causes the onboard vehicle computer system to: receive a V2X wireless message from a network, where the V2X wireless message includes remote GPS data and remote road parameter data generated by a remote vehicle; retrieve ego GPS data from the GPS unit of the ego vehicle; generate ego road parameter data describing an initial estimate of a geometry of a road on which the ego vehicle is located; fuse the ego road parameter data and the remote road parameter data to form fused road parameter data, where the fused road parameter data describes an improved estimate of the geometry of the road that is more accurate than the initial estimate; and generate HD map data describing a real-time HD map based on the remote GPS data, the ego GPS data and the fused road parameter data. Other embodiments of this aspect include corresponding computer systems, apparatus, and computer programs recorded on one or more computer storage devices, each configured to perform the actions of the methods.

Implementations may include one or more of the following features. The system where the system further includes a vehicle control system and the computer code which, when executed by the onboard vehicle computer system, causes the onboard vehicle computer system further to: input the HD map data to the vehicle control system to improve accuracy of a vehicle tracking technique controlled by the vehicle control system; and execute the vehicle tracking technique based on the HD map data to track movement of the remote vehicle. The system where the computer code which, when executed by the onboard vehicle computer system, causes the onboard vehicle computer system further to: input the HD map data to the vehicle control system for modifying an operation of the vehicle control system based on the HD map data so that the vehicle control system controls an operation of the ego vehicle based on the HD map data. The system where the vehicle control system includes one of an ADAS system and an autonomous driving system. The system where the V2X wireless message further includes path history data describing multiple path history points of the remote vehicle, the remote road parameter data includes a lateral offset of the remote vehicle from a center of a reference lane, and the computer code which, when executed by the onboard vehicle computer system, causes the onboard vehicle computer system to generate the HD map data at least by: generating one or more interpolated points based on the multiple path history points, where a lateral offset for each of the one or more interpolated points is estimated based on the lateral offset of the remote vehicle; and generating a path of the remote vehicle on the HD map based on the multiple path history points and the one or more interpolated points. The system where the remote road parameter data further includes one or more of a relative heading of the remote vehicle, curvature of the reference lane, and a curvature change rate of the reference lane. Implementations of the described techniques may include hardware, a method or process, or computer software on a computer-accessible medium.

One general aspect includes a computer program product including a non-transitory memory of an onboard vehicle computer system of an ego vehicle storing computer-executable code that, when executed by a processor, causes the processor to: receive a Vehicle-to-Anything (V2X) wireless message from a network, where the V2X wireless message includes remote GPS data and remote road parameter data generated by a remote vehicle; retrieve ego GPS data from a GPS unit of the ego vehicle; generate ego road parameter data describing an initial estimate of a geometry of a road on which the ego vehicle is located; fuse the ego road parameter data and the remote road parameter data to form fused road parameter data, where the fused road parameter data describes an improved estimate of the geometry of the road that is more accurate than the initial estimate; and generate high-definition (HD) map data describing a real-time HD map based on the remote GPS data, the ego GPS data and the fused road parameter data. Other embodiments of this aspect include corresponding computer systems, apparatus, and computer programs recorded on one or more computer storage devices, each configured to perform the actions of the methods.

Implementations may include one or more of the following features. The computer program product where the computer-executable code that, when executed by the processor, causes the processor further to: input the HD map data to a vehicle control system to improve accuracy of a vehicle tracking technique controlled by the vehicle control system; and execute the vehicle tracking technique based on the HD map data to track movement of the remote vehicle. The computer program product where the computer-executable code that, when executed by the processor, causes the processor further to: input the HD map data to the vehicle control system for modifying an operation of the vehicle control system based on the HD map data so that the vehicle control system controls an operation of the ego vehicle based on the HD map data. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

FIG. 1B is a block diagram illustrating a wireless message generated by a remote vehicle according to some embodiments.

FIG. 1C is a block diagram illustrating a flow process for generating a real-time HD map according to some embodiments.

FIG. 8A is a block diagram illustrating an example of BSM data according to some embodiments.

FIG. 8B is a block diagram illustrating an example of BSM data according to some embodiments.

DETAILED DESCRIPTION

Figure 1A:
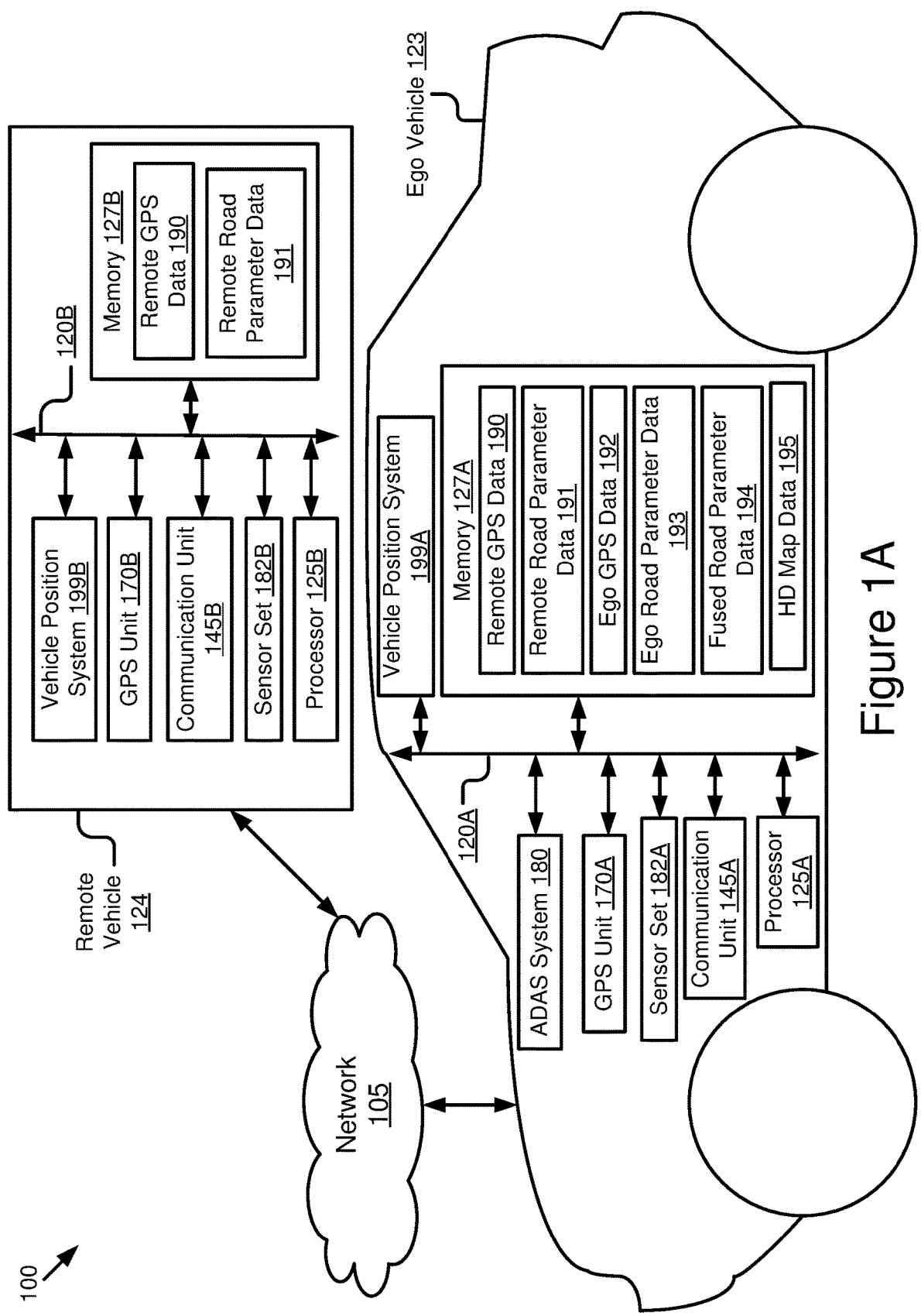
FIG. 1A is a block diagram illustrating an operating environment for a vehicle position system according to some embodiments.

Embodiments of a vehicle position system that are operable to generate real-time HD maps based at least in part on a wireless message received via V2X communications are now described. Examples of V2X communications described herein include one or more of the following: DSRC (including Basic Safety Messages (BSMs) and Pedestrian Safety Messages (PSMs), among other types of DSRC communication); LTE; millimeter wave communication; 3G; 4G; 5G LTE-Vehicle-to-Everything (LTE-V2X); LTE-Vehicle-to-Vehicle (LTE-V2V); LTE-Device-to-Device (LTE-D2D); Voice over LTE (VoLTE); etc.

In some embodiments, a connected vehicle that includes the vehicle position system is a DSRC-equipped vehicle. A DSRC-equipped vehicle is a vehicle which: (1) includes a DSRC radio; (2) includes a DSRC-compliant Global Positioning System (GPS) unit; and (3) is operable to lawfully send and receive DSRC messages in a jurisdiction where the DSRC-equipped vehicle is located. A DSRC radio is hardware that includes a DSRC receiver and a DSRC transmitter. The DSRC radio is operable to wirelessly send and receive DSRC messages.

A DSRC-compliant GPS unit is operable to provide positional information for a vehicle (or some other DSRC-equipped device that includes the DSRC-compliant GPS unit) that has lane-level accuracy. In some embodiments, a DSRC-compliant GPS unit is operable to identify, monitor and track its two-dimensional position within 1.5 meters of its actual position 68% of the time under an open sky.

A conventional GPS unit provides positional information that describes a position of the conventional GPS unit with an accuracy of plus or minus 10 meters of the actual position of the conventional GPS unit. By comparison, a DSRC-compliant GPS unit provides GPS data that describes a position of the DSRC-compliant GPS unit with an accuracy of plus or minus 1.5 meters of the actual position of the DSRC-compliant GPS unit. This degree of accuracy is referred to as "lane-level accuracy" since, for example, a lane of a roadway is generally about 3 meters wide, and an accuracy of plus or minus 1.5 meters is sufficient to identify which lane a vehicle is traveling in on a roadway. Some safety or autonomous driving applications provided by the ADAS system of a modern vehicle require positioning information that describes the geographic position of the vehicle with lane-level accuracy. In addition, the current standard for DSRC requires that the geographic position of the vehicle be described with lane-level accuracy.

DSRC has a range of substantially 500 meters and is designed to be compatible for wirelessly sending and receiving messages among mobile nodes such as vehicles and Roadside Units ("RSU" if singular, "RSUs" if plural).

In some embodiments, the ego vehicle and the remote vehicle may be DSRC-equipped vehicles. The ego vehicle and the remote vehicle may each include (1) a GPS unit; and (2) a vehicle position system.

In some embodiments, devices other than vehicles may be DSRC-equipped. These DSRC-equipped devices may be used to relay wireless vehicle data to the ego vehicle via a DSRC message. For example, an RSU or any other communication device may be DSRC-equipped if it includes one or more of the following elements: a DSRC transceiver and any software or hardware necessary to encode and transmit a DSRC message; and a DSRC receiver and any software or hardware necessary to receive and decode a DSRC message.

The embodiments described herein may use V2X communication to transmit and receive wireless vehicle data among an ego vehicle and one or more remote vehicles. Wireless vehicle data may include any data that is: (1) associated with a vehicle; and (2) transmitted via a wireless message such as a DSRC message or a BSM message by either a DSRC-equipped vehicle or a DSRC-equipped device.

For simplicity and convenience of description, a wireless message described herein may be referred to as a V2X message. An example V2X message is a DSRC message that includes wireless vehicle data. There are many types of DSRC messages. One type of SRC messages is known as a Basic Safety Message ("BSM" or a "BSM message"). DSRC-equipped vehicles broadcast a BSM at a regular interval. The interval may be user adjustable. In some embodiments, the interval may be once every 0.10 seconds.

A BSM includes BSM data. The BSM data describes attributes of the vehicle that originally transmitted the BSM. The BSM data describes, among other things, one or more of the following: (1) the path history of the vehicle that transmits the BSM; (2) the speed of the vehicle that transmits the BSM; and (3) the GPS data describing a location of the vehicle that transmits the BSM. FIGS. 8A and 8B, which are described below, depict examples of BSM data according to some embodiments.

In some embodiments, DSRC-equipped vehicles may probe other DSRC-equipped vehicles/devices along the roadway for information describing their current and future conditions, including their path history, future path, and remote sensor data they may have received or generated. This information is described as "DSRC probe data." DSRC probe data may include any data received via a DSRC probe or responsive to a DSRC probe.

A DSRC message may include DSRC-based data. The DSRC-based data may include BSM data or DSRC probe data. In some embodiments, the DSRC-based data included in a DSRC message may include BSM data or DSRC probe data received from a plurality of DSRC-equipped vehicles (or other DSRC-equipped devices). This BSM data or DSRC probe data may include an identifier of its source and the location of the source or any traffic events described by the BSM data or DSRC probe data.

The BSM data or DSRC probe data may specify which lane a vehicle is traveling in as well as its speed of travel and path history. The BSM data or DSRC probe data may further specify one or more of the following: a velocity of the vehicle at one or more different times or one or more different locations; a heading of the vehicle at one or more different times or one or more different locations; and an acceleration of the vehicle at one or more different times or one or more different locations.

Another type of a wireless message is a full-duplex wireless message described in U.S. patent application Ser. No. 14/471,387 filed on Aug. 28, 2014 and entitled "Full-Duplex Coordination System," the entirety of which is herein incorporated by reference.

Examples of wireless vehicle data are depicted in FIGS. 1B, 1C, 1D, 8A and 8B according to some embodiments. Additionally, any of the data depicted in FIG. 1A may be included in a wireless message transmitted by one or more vehicles, and so, this data too may be examples of wireless vehicle data according to some embodiments.

In embodiments of the disclosure, assume that two vehicles (e.g., an ego vehicle and a remote vehicle) travel on a roadway within a wireless communication range of one another. The vehicle position system described herein improves accuracy of a real-time HD map generated for the ego vehicle using wireless vehicle data received from the remote vehicle. The vehicle position system also beneficially improves safety and efficiency of a vehicle control system of the ego vehicle.

In some embodiments, the ego vehicle and the remote vehicle each include wireless communication capabilities such as DSRC or LTE-V2X. The ego vehicle and the remote vehicle also each include an onboard GPS unit. The remote vehicle includes additional sensors such as Radar, LIDAR, onboard cameras, etc.

The remote vehicle tracks its own position using the GPS unit to form remote GPS data. The remote GPS data includes data sourced from the onboard GPS unit of the remote vehicle that describes a geographic location of the remote vehicle. For example, the remote GPS data includes latitude, longitude, heading, etc. of the remote vehicle. The remote vehicle measures road parameters using onboard sensors to generate remote road parameter data. For example, the remote road parameter data includes a lateral offset from a center of the remote vehicle's lane using the remote vehicle's onboard camera.

The remote vehicle transmits a wireless message to the ego vehicle. This wireless message includes the remote GPS data and the remote road parameter data. This wireless message may be transmitted to the ego vehicle via DSRC, LTE-V2X, or some other form of wireless communication. The wireless message may be a BSM message that includes path history data.

The ego vehicle receives the wireless message from the remote vehicle. The ego vehicle tracks its own position using an onboard GPS unit to form ego GPS data. The ego GPS data includes data sourced from the onboard GPS unit that describes a geographic location of the ego vehicle. The ego vehicle generates ego road parameter data that describes, for example, its own estimate of the road geometry obtained by its onboard sensors. The ego vehicle fuses the remote road parameter data received from the remote vehicle with its own estimate of the road geometry obtained by its on-board sensors. This fusing operation may be achieved by Kalman filtering or another fusing technique that is operable to improve the accuracy of a measurement for a variable using multiple other measurements of the same variable. The ego vehicle generates a HD map based on: (1) the remote GPS data; (2) the ego GPS data; and (3) the fused road parameter data. The HD map is stored on the ego vehicle as HD map data.

This patent application is related to U.S. patent application Ser. No. 15/331,597 filed on Oct. 21, 2016 and entitled "Improved Estimate of Geographic Position of a Vehicle Using Wireless Vehicle Data," the entirety of which is hereby incorporated by reference.

Example Overview

Referring to FIG. 1A, depicted is an operating environment 100 for a first vehicle position system 199A and a second vehicle position system 199B. The first vehicle position system 199A and the second vehicle position system 199B may be referred to collectively or individually as the "vehicle position system 199."

The operating environment 100 may include one or more of the following elements: an ego vehicle 123; and a remote vehicle 124. These elements of the operating environment 100 may be communicatively coupled to a network 105. Although not depicted in FIG. 1A, the operation environment 100 may include one or more RSUs that are DSRC-enabled (see, e.g., the RSU 104 depicted in FIG. 1D). The one or more DSRC-enabled RSUs may relay wireless messages among the ego vehicle 123 and the remote vehicle 124 via the network 105. For example, the range of DSRC transmissions is generally about 500 meters, and so, if the remote vehicle 124 is 700 meters away from the ego vehicle 123, then one or more intervening DSRC-enabled RSUs may relay a DSRC message from the remote vehicle 124 to the ego vehicle 123 or from the ego vehicle 123 to the remote vehicle 124.

Although one ego vehicle 123, one remote vehicle 124 and one network 105 are depicted in FIG. 1A, in practice the operating environment 100 may include one or more ego vehicles 123, one or more remote vehicles 124 and one or more networks 105.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, LTE, LTE-V2V, LTE-V2X, LTE-D2D, VoLTE, LTE-5G or any other mobile data network or combination of mobile data networks. Further, the network 105 may include one or more IEEE 802.11 wireless networks.

In some embodiments, one or more of the ego vehicle 123 and the remote vehicle 124 may be DSRC-equipped vehicles. The network 105 may include one or more communication channels shared among the ego vehicle 123, the remote vehicle 124 and one or more RSUs. The communication channel may include DSRC, LTE-V2X, full-duplex wireless communication or any other wireless communication protocol. For example, the network 105 may be used to transmit a DSRC message, DSRC probe or BSM including any of the data described herein.

The ego vehicle 123 and the remote vehicle 124 may include the same or similar elements. The ego vehicle 123 and the remote vehicle 124 may share a connection or association. For example, the ego vehicle 123 and the remote vehicle 124 may share a common manufacturer (e.g., Toyota) and the functionality described herein may only be provided to vehicles sharing this common manufacturer.

The ego vehicle 123 and the remote vehicle 124 may be any type of vehicle. The ego vehicle 123 and the remote vehicle 124 may be the same type of vehicle relative to one another or different types of vehicles relative to one another. For example, either the ego vehicle 123 or the remote vehicle 124 may include one of the following types of vehicles: a car; a truck;

a sports utility vehicle; a bus; a semi-truck; a drone or any other roadway-based conveyance.

In some embodiments, one or more of the ego vehicle 123 and the remote vehicle 124 may include an autonomous vehicle or a semi-autonomous vehicle. For example, one or more of the ego vehicle 123 and the remote vehicle 124 may include an ADAS system 180. The ADAS system 180 may provide some or all of the functionality that provides autonomous functionality.

The ego vehicle 123 may include one or more of the following elements: a processor 125A; a memory 127A; a communication unit 145A; a GPS unit 170A; the ADAS system 180; a sensor set 182A; and the vehicle position system 199A. These elements of the ego vehicle 123 may be communicatively coupled to one another via a bus 120A.

The remote vehicle 124 includes, among other things, one or more of the following elements communicatively coupled to one another via a bus 120B: a processor 125B; a memory 127B; a communication unit 145B; a GPS unit 170B; a sensor set 182B; and the vehicle position system 199B. In some embodiments, the remote vehicle 124 may also include an ADAS system.

The bus 120A of the ego vehicle 123 and the bus 120B of the remote vehicle may be referred to herein collectively or individually as the "bus 120" since, for example, the bus 120A of the ego vehicle 123 provides similar functionality to the components of the ego vehicle 123 as does the bus 120B of the remote vehicle 124. For similar reasons, the description provided herein uses the following terms when referring to elements that are common to the ego vehicle 123 and the remote vehicle 124 and provide similar functionality to the ego vehicle 123 or the remote vehicle 124: the "processor 125" when referring to the processor 125A and the processor 125B, collectively or individually; the "memory 127" when referring to the memory 127A and the memory 127B, collectively or individually; the "communication unit 145" when referring to the communication unit 145A and the communication unit 145B, collectively or individually; the "GPS unit 170" when referring to the GPS unit 170A and the GPS unit 170B, collectively or individually; the "sensor set 182" when referring to the sensor set 182A and the sensor set 182B, collectively or individually; and the "vehicle position system 199" when referring to the vehicle position system 199A and the vehicle position system 199B, collectively or individually.

In some embodiments, one or more of the ego vehicle 123 and the remote vehicle 124 may also include one or more antennas for transmitting and receiving WiFi messages, 3G messages, 4G messages, LTE messages, etc. The ego vehicle 123 and the remote vehicle 124 are now described below, respectively.

Ego Vehicle 123

In some embodiments, the processor 125 and the memory 127 may be elements of an onboard vehicle computer system (such as computer system 200 described below with reference to FIG. 2). The onboard vehicle computer system may be operable to cause or control the operation of the vehicle position system 199. The onboard vehicle computer system may be operable to access and execute the data stored on the memory 127 to provide the functionality described herein for the vehicle position system 199 or its elements (see, e.g., FIG. 2).

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. The ego vehicle 123 and the remote vehicle 124 may each include one or more processors 125. Other processors, operating systems, sensors, displays, and physical configurations may be possible.

The memory 127 stores instructions or data that may be executed by the processor 125. The instructions or data may include code for performing the techniques described herein. The memory 127 may be a dynamic random-access memory (DRAM) device, a static random-access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The ego vehicle 123 and the remote vehicle 124 may each include one or more memories 127.

The memory 127 of the ego vehicle 123 may store one or more of the following elements: remote GPS data 190; remote road parameter data 191; ego GPS data 192; ego road parameter data 193; fused road parameter data 194; and HD map data 195.

The remote GPS data 190 describes the geographic location of the remote vehicle 124. For example, the remote GPS data 190 describes a longitude and latitude of the remote vehicle 124. In some embodiments, the remote GPS data 190 may be retrieved by a conventional GPS unit of the remote vehicle 124. For example, the GPS unit 170 of the remote vehicle 124 retrieves the remote GPS data 190 from one or more GPS satellites, and the vehicle position system 199 of the remote vehicle 124 causes the processor 125 of the remote vehicle 124 to store the remote GPS data 190 on the memory 127 of the remote vehicle 124.

In some embodiments, the remote GPS data 190 may be retrieved by a DSRC-compliant GPS unit of the remote vehicle 124 that is operable to provide GPS data describing the geographic location of the remote vehicle 124 with lane-level accuracy. For example, the remote vehicle 124 is traveling in a lane of a roadway. Lane-level accuracy means that the location of the remote vehicle 124 is described by the GPS data so accurately that the lane of travel of the remote vehicle 124 within the roadway may be accurately determined based on the GPS data for this remote vehicle 124 as provided by the DSRC-compliant GPS unit. In some embodiments, the remote GPS data is an element of the BSM data or the PSM data.

The remote road parameter data 191 describes one or more road parameters of a roadway where the remote vehicle 124 is located. For example, the remote road parameter data 191 describes one or more of the following road parameters: a lateral offset of the remote vehicle 124 from a center of a reference lane (e.g., the reference lane can be a lane on which the remote vehicle 124 is located currently or a lane on which the remote vehicle 124 was previously located); a relative heading of the remote vehicle 124; curvature of the reference lane; and a curvature change rate of the reference lane, etc.

As will be described in more detail below, the vehicle position system 199 of the remote vehicle 124 may cause the communication unit 145 of the remote vehicle 124 to generate a wireless message that includes the remote GPS data 190 and the remote road parameter data 191; the communication unit 145 of the remote vehicle 124 may transmit the wireless message to the ego vehicle 123 via the network 105. The vehicle position system 199 of the ego vehicle 123 may store the remote GPS data 190 and the remote road parameter data 191 on the memory 127 of the ego vehicle 123.

The ego GPS data 192 describes the geographic location of the ego vehicle 123. For example, the ego GPS data 192 describes a longitude and latitude of the ego vehicle 123. In some embodiments, the ego GPS data 192 may be retrieved by a conventional GPS unit of the ego vehicle 123. For example, the GPS unit 170 of the ego vehicle 123 retrieves the ego GPS data 192 from one or more GPS satellites and the vehicle position system 199 of the ego vehicle 123 causes the processor 125 of the ego vehicle 123 to store the ego GPS data 192 on the memory 127 of the ego vehicle 123.

In some embodiments, the ego GPS data 192 may be retrieved by a DSRC-compliant GPS unit of the ego vehicle 123 that is operable to provide GPS data describing the geographic location of the ego vehicle 123 with lane-level accuracy. For example, the ego vehicle 123 is traveling in a lane of a roadway. Lane-level accuracy means that the location of the ego vehicle 123 is described by the GPS data so accurately that the lane of travel of the ego vehicle 123 within the roadway may be accurately determined based on the GPS data for this ego vehicle 123 as provided by the DSRC-compliant GPS unit.

The ego road parameter data 193 describes one or more road parameters of a roadway where the ego vehicle 123 is located. For example, the ego road parameter data 193 describes one or more of the following road parameters: a lateral offset of the ego vehicle 123 from a center of a reference lane (e.g., the reference lane can be a lane on which the ego vehicle 123 is located currently or a lane on which the ego vehicle 123 was previously located); a relative heading of the ego vehicle 123; curvature of the reference lane; and a curvature change rate of the reference lane, etc. In some embodiments, the ego road parameter data 193 describes an initial estimate of a geometry of a road on which the ego vehicle 123 is located.

The fused road parameter data 194 describes an improved estimate of the geometry of the road on which the ego vehicle 123 is located. The improved estimate of the geometry of the road is more accurate than the initial estimate of the geometry of the road. Generation of the fused road parameter data 194 is described below in more detail.

The HD map data 195 describes a HD map generated for the ego vehicle 123. In some embodiments, the HD map is a real-time HD map.

The communication unit 145 transmits and receives data to and from a network 105 or to another communication channel. In some embodiments, the communication unit 145 may include a DSRC transceiver, a DSRC receiver and other hardware or software necessary to make the ego vehicle 123 a DSRC-enabled device. For example, the communication unit 145 includes a DSRC antenna configured to broadcast DSRC messages via the network. The DSRC antenna may also transmit BSM messages at a fixed interval (e.g., every 0.1 seconds, at a time interval corresponding to a frequency range from 1.6 Hz to 10 Hz, etc.) that is user configurable.

In some embodiments, the communication unit 145 includes a port for direct physical connection to the network 105 or to another communication channel. For example, the communication unit 145 includes a USB, SD, CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection—Application interface EN 11253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471,387 filed on Aug. 28, 2014 and entitled "Full-Duplex Coordination System"; or another suitable wireless communication method.

In some embodiments, the communication unit 145 includes a full-duplex coordination system as described in U.S. patent application Ser. No. 14/471,387 filed on Aug. 28, 2014 and entitled "Full-Duplex Coordination System."

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

In some embodiments, the GPS unit 170 is a conventional GPS unit of the ego vehicle 123. For example, the GPS unit 170 may include hardware that wirelessly communicates with a GPS satellite to retrieve data that describes a geographic location of the ego vehicle 123. For example, the GPS unit 170 retrieves the ego GPS data 192 from one or more GPS satellites. In some embodiments, the GPS unit 170 is a DSRC-compliant GPS unit of the ego vehicle 123 that is operable to provide GPS data describing the geographic location of the ego vehicle 123 with lane-level accuracy (e.g., an accuracy whose precision is substantially equal to plus or minus half the width of a roadway upon which the ego vehicle 123 travels).

The ADAS system 180 may include one or more advanced driver assistance systems. Examples of the ADAS system 180 may include one or more of the following elements of an ego vehicle 123: an ACC system; an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane departure warning system; a pedestrian protection system; a traffic sign recognition system; a turning assistant; and a wrong-way driving warning system.

In some embodiments, the ADAS system 180 includes any hardware or software that controls one or more operations of the ego vehicle 123 so that the ego vehicle 123 is "autonomous" or "semi-autonomous."

The sensor set 182 includes one or more sensors that are operable to measure the roadway environment outside of the ego vehicle 123. For example, the sensor set 182 may include one or more sensors that record one or more physical characteristics of the road environment that is proximate to the ego vehicle 123. The memory 127 may store sensor data that describes the one or more physical characteristics recorded by the sensor set 182. The roadway environment outside of the ego vehicle 123 may include the remote vehicle 124, and so, one or more of the sensors of the sensor set 182 may record sensor data that describes information about the remote vehicle 124.

In some embodiments, the sensor set 182 may include one or more of the following vehicle sensors: a camera; a LIDAR sensor; a radar sensor; a laser altimeter; an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

One or more sensors of the sensor set 182 may be operable to record sensor data that describes one or more locations of the ego vehicle 123 at one or more different times; this data may be timestamped to indicate the time when the ego vehicle 123 was at this particular location.

In some embodiments, the vehicle position system 199 includes software that is operable, when executed by the processor 125, to cause the processor 125 to execute one or more steps of a method 300 and an example process 400 described below with reference to FIGS. 3-4. The vehicle position system 199 improves the real-time HD map generation for the ego vehicle 123 using a wireless message received from the remote vehicle 124. For example, the vehicle position system 199 receives a V2X wireless message including remote GPS data and remote road parameter data from the remote vehicle 124. The vehicle position system 199 retrieves ego GPS data from its onboard GPS unit 170 and generates ego road parameter data that describes an initial estimate of a road geometry using onboard sensors. The vehicle position system 199 fuses the remote road parameter data from the remote vehicle 124 with the ego road parameter data, and generates the real-time HD map from the remote GPS data, the ego GPS data, and the fused road parameter data In some embodiments, the vehicle position system 199 may be implemented using hardware including a field-programmable gate array ("FPGA") or an application-specific integrated circuit ("ASIC"). In some other embodiments, the vehicle position system 199 may be implemented using a combination of hardware and software. The vehicle position system 199 may be stored in a combination of the devices (e.g., servers or other devices), or in one of the devices.

Remote Vehicle 124

The following elements of the remote vehicle 124 are the same or similar to those described above for the ego vehicle 123, and so, the descriptions of these elements will not be repeated here: the processor 125; the memory 127; the communication unit 145; the GPS unit 170; and the sensor set 182.

The memory 127 of the remote vehicle 124 stores one or more of the following elements: the remote GPS data 190; and the remote road parameter data 191. These elements stored in the memory 127 of the remote vehicle 124 are described above with reference to the ego vehicle 123, and so, their descriptions will not be repeated here.

The vehicle position system 199 of the remote vehicle 124 may include hardware or software that is operable to provide the same or similar functionality as the vehicle position system 199 of the ego vehicle 123. For example, the vehicle position system 199 of the remote vehicle 124 and the ego vehicle 123 may be identical or similar to each other.

In some embodiments, the vehicle position system 199 of the remote vehicle 124 may be operable to cause one or more sensors of the sensor set 182 to record one or more road parameters of a roadway on which the remote vehicle 124 is located. The recorded sensor data is processed and stored as the remote road parameter data 191 in the memory 127. The vehicle position system 199 of the remote vehicle 124 may also be operable to cause the GPS unit 170 of the remote vehicle 124 to retrieve the remote GPS data 190 at a time that is the same or proximate to when the remote road parameter data 191 is recorded by the sensor set 182.

As described in more detail below with reference to FIGS. 1B and 1C, in some embodiments the vehicle position system 199 of the remote vehicle 124 may be operable to form a V2X wireless message that includes one or more of the remote GPS data 190 and the remote road parameter data 191. The vehicle position system 199 of the remote vehicle 124 may cause the communication unit 145 of the remote vehicle 124 to transmit the V2X wireless message to the network 105.

Referring now to FIG. 1B, depicted is a block diagram illustrating a remote vehicle wireless message 159 according to some embodiments. The remote vehicle wireless message 159 may be transmitted by the remote vehicle 124 to the network 105. In some embodiments, the remote vehicle wireless message 159 may be transmitted to the network 105 via any wireless communication protocol, including, for example, DSRC, LTE-V2X (or any other cellular-based communication), full-duplex wireless communication, millimeter wave communication, etc. In some embodiments, the remote vehicle wireless message 159 may be received by the ego vehicle 123 from the network 105.

The remote vehicle wireless message 159 may include wireless vehicle data. For example, the remote vehicle wireless message 159 may include one or more of the following elements: remote ID data 162 which uniquely identifies the remote vehicle 124 that transmits the remote vehicle wireless message 159; remote GPS data 190 that describes the geographic position or location of the remote vehicle 124 identified by the remote ID data 162 at a time that corresponds to the remote road parameter data 191; and the remote road parameter data 191 generated from sensor data recorded by onboard sensors of the remote vehicle 124.

The remote ID data 162 may uniquely identify the remote vehicle 124 which transmits the remote vehicle wireless message 159. The remote ID data 162 for a particular remote vehicle 124 may remain constant over time.

Optionally, the remote vehicle wireless message 159 may include an ego ID data 164 that uniquely identifies an ego vehicle 123 which is intended to receive the remote vehicle wireless message 159. In some embodiments, the remote vehicle wireless message 159 is broadcasted over the network 105 to be received by any nearby vehicles and no ego ID data is included in the remote vehicle wireless message 159.

Referring now to FIG. 1C, depicted is a block diagram illustrating a flow process 155 for the ego vehicle 123 to generate a real-time HD map according to some embodiments.

The remote vehicle 124 may transmit the remote vehicle wireless message 159 to the ego vehicle 123 via the network 105. For example, responsive to an ego vehicle wireless message received from the ego vehicle 123 via the network 105 (e.g., the ego vehicle wireless message may include a request for remote GPS data and remote road parameter data from the remote vehicle 124), the remote vehicle 124 may transmit the remote vehicle wireless message 159 to the ego vehicle 123 via the network 105.

The communication unit 145 of the ego vehicle 123 receives the remote vehicle wireless message 159 and stores the remote vehicle wireless message 159 in the memory 127. The vehicle position system 199 of the ego vehicle 123 retrieves the remote road parameter data 191 and the ego road parameter data 193 from the memory 127 and generates the fused road parameter data 194 based on the remote road parameter data 191 and the ego road parameter data 193. Next, the vehicle position system 199 of the ego vehicle 123 retrieves the remote GPS data 190 and the ego GPS data 192 from the memory 127 and generates HD map data 195 describing a real-time HD map based on the remote GPS data 190, the ego GPS data 192 and the fused road parameter data 194.

In some embodiments, the ego vehicle 123 includes a vehicle control system 130. The vehicle control system 130 may be operable to control one or more operations of the ego vehicle 123. For example, the vehicle control system 130 includes one of an ADAS system and an autonomous driving system. The HD map data 195 may be inputted to the vehicle control system 130 to improve performance of the vehicle control system 130. For example, the HD map data 195 may be inputted to the vehicle control system 130 to improve accuracy of a vehicle tracking technique controlled by the vehicle control system 130, so that the vehicle tracking technique may be executed based on the HD map data to track movement of the remote vehicle 124. In another example, inputting the HD map data to the vehicle control system 130 includes modifying an operation of the vehicle control system 130 based on the HD map data so that the vehicle control system 130 controls the operation of the ego vehicle 123 based on the HD map data. The vehicle control system 130 is described in more detail below with combined reference to a control module 212 in FIG. 2.

Figure 1D:
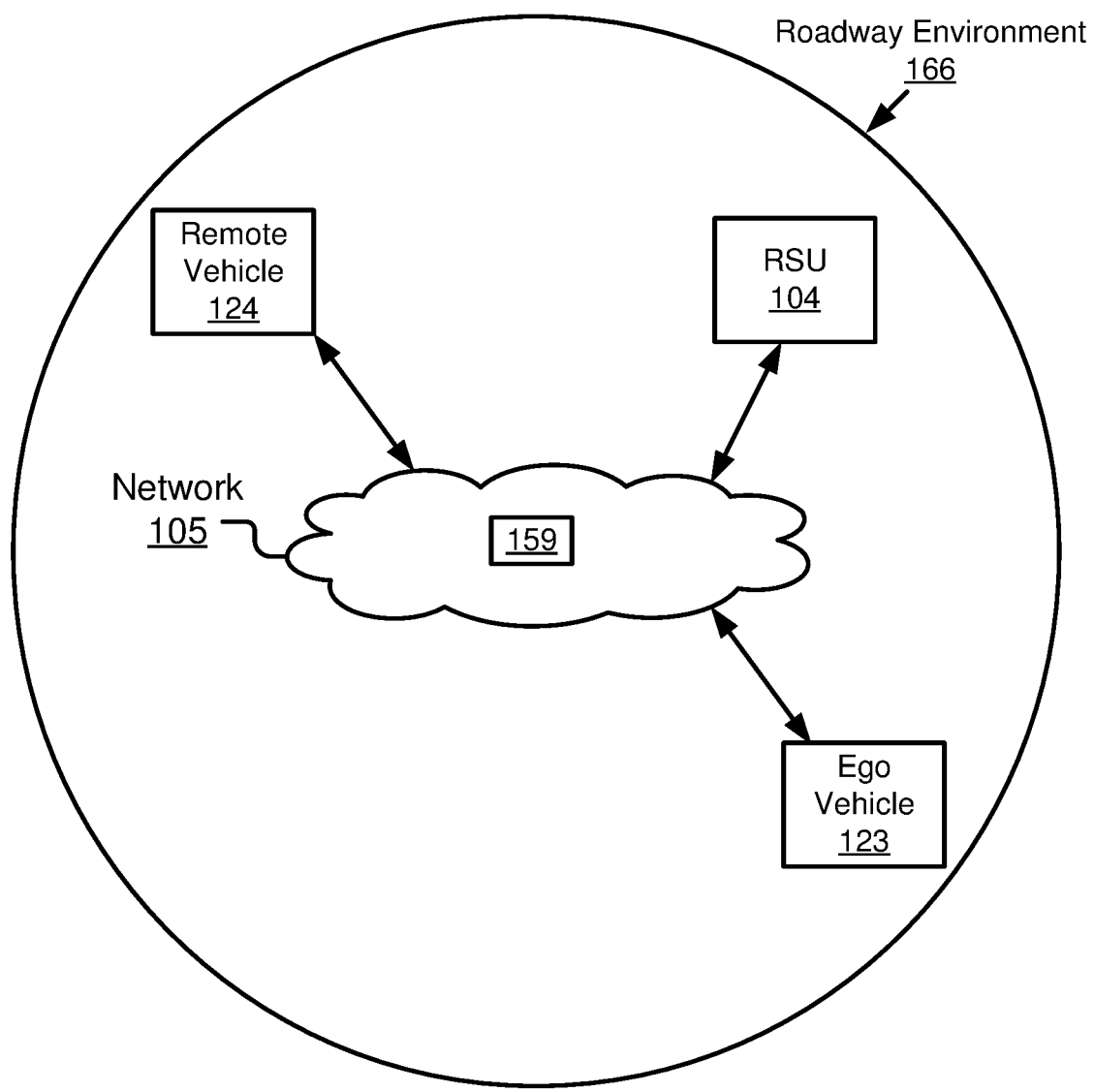
FIG. 1D is a block diagram illustrating a roadway environment for a vehicle position system according to some embodiments.

Referring now to FIG. 1D, depicted is a block diagram illustrating a roadway environment 166 according to some embodiments. The roadway environment 166 may include one or more of the following: the remote vehicle 124; an RSU 104; the network 105; and the ego vehicle 123. These entities of the roadway environment 166 may transmit the remote vehicle wireless message 159 via the network 105. For example, if the remote vehicle 124 is outside of DSRC range or LTE-V2V range of the ego vehicle 123, then the RSU 104 may relay the remote vehicle wireless message 159 from the remote vehicle 124 to the ego vehicle 123 via the network 105.

Example Computer System

Figure 2:
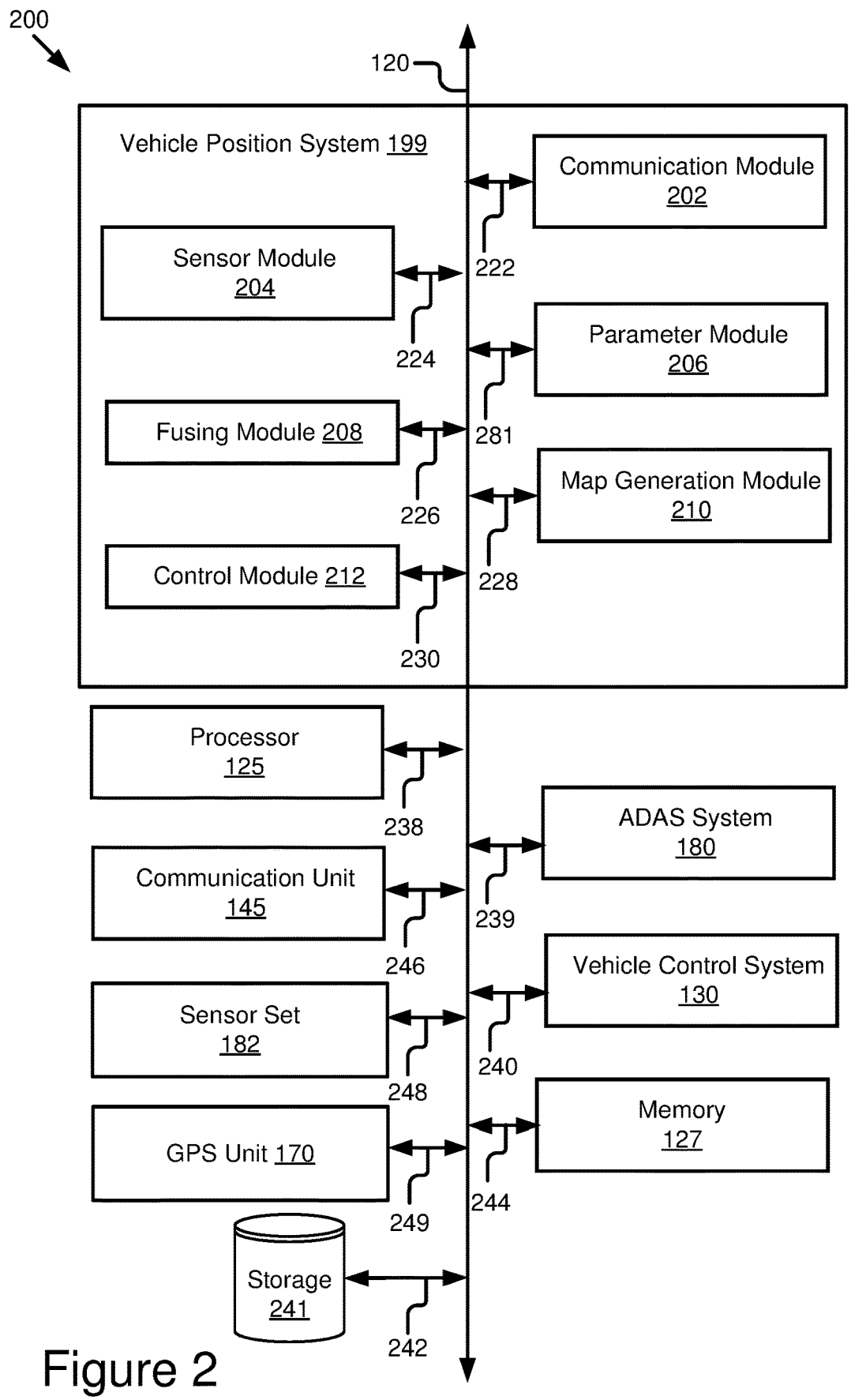
FIG. 2 is a block diagram illustrating an example computer system including a vehicle position system according to some embodiments.

Referring now to FIG. 2, depicted is a block diagram illustrating an example computer system 200 including a vehicle position system 199 according to some embodiments. In some embodiments, the computer system 200 may include a special-purpose computer system that is programmed to perform one or more steps of a method 300 described below with reference to FIG. 3, a process 400 described below with reference to FIG. 4 or the flow process 155 described above with reference to FIG. 1C.

In some embodiments, the computer system 200 may be an element of one or more of the ego vehicle 123 and the remote vehicle 124. In some embodiments, the computer system 200 may be an onboard vehicle computer of one or more of the ego vehicle 123 and the remote vehicle 124. In some embodiments, the computer system 200 may include an engine control unit, head unit or some other processor-based computing device of one or more of the ego vehicle 123 and the remote vehicle 124.

For simplicity and convenience of description, here assume that the computer system 200 is an element of the ego vehicle 123 without loss of generality.

The computer system 200 may include one or more of the following elements according to some examples: the vehicle position system 199; the processor 125; the communication unit 145; the sensor set 182; the GPS unit 170; the ADAS system 180; the vehicle control system 130; the memory 127; and a storage 241. The components of the computer system 200 are communicatively coupled by the bus 120.

In the illustrated embodiment, the processor 125 is communicatively coupled to the bus 120 via a signal line 238. The communication unit 145 is communicatively coupled to the bus 120 via a signal line 246. The sensor set 182 is communicatively coupled to the bus 120 via a signal line 248. The GPS unit 170 is communicatively coupled to the bus 120 via a signal line 249. The ADAS system 180 is communicatively coupled to the bus 120 via a signal line 239. The vehicle control system 130 is communicatively coupled to the bus 120 via a signal line 240. The storage 241 is communicatively coupled to the bus 120 via a signal line 242. The memory 127 is communicatively coupled to the bus 120 via a signal line 244.

The following elements of the computer system 200 are described above with reference to FIG. 1A, and so, those descriptions will not be repeated here: the processor 125; the communication unit 145; the sensor set 182; the GPS unit 170; the ADAS system 180; the vehicle control system 130; and the memory 127.

The memory 127 may store any of the data described above with reference to FIGS. 1A-1D. The memory 127 may store any data necessary for the computer system 200 to provide its functionality.

In some embodiments, the memory 127 may store BSM data 800 (depicted in FIGS. 8A-8B). The BSM data 800 may include any data included in a BSM. The BSM data 800 may be received by the communication unit 145 as an element of a BSM. Optionally, the BSM may be formed by the communication module 202 and transmitted by the communication unit 145. The BSM data 800 may be encoded in a BSM (e.g., by a communication module 202). The BSM data 800 may be included in a BSM built by the communication module 202 and transmitted to the network 105 by the communication unit 145. Any of the data stored in the memory 127 may be included in the BSM data 800. The BSM data 800 is described in more detail below with reference to FIGS. 8A and 8B. In some embodiments, the remote vehicle wireless message may be transmitted as a BSM and so, it may include BSM data 800.

The storage 241 can be a non-transitory storage medium that stores data for providing the functionality described herein. The storage 241 may be a dynamic random-access memory (DRAM) device, a static random-access memory (SRAM) device, flash memory, or some other memory devices. In some embodiments, the storage 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated embodiment shown in FIG. 2, the vehicle position system 199 includes: a communication module 202; a sensor module 204; a parameter module 206; a fusing module 208; a map generation module 210; and a control module 212. These components of the vehicle position system 199 are communicatively coupled to each other via the bus 120. In some embodiments, components of the vehicle position system 199 can be stored in a single server or device. In some other embodiments, components of the vehicle position system 199 can be distributed and stored across multiple servers or devices. For example, some of the components of the vehicle position system 199 may be distributed across the remote vehicle 124 and the ego vehicle 123.

The communication module 202 can be software including routines for handling communications between the vehicle position system 199 and other components of the computer system 200. In some embodiments, the communication module 202 can be stored in the memory 127 of the computer system 200 and can be accessible and executable by the processor 125. The communication module 202 may be adapted for cooperation and communication with the processor 125 and other components of the computer system 200 via a signal line 222.

The communication module 202 sends and receives data, via the communication unit 145, to and from one or more elements of the operating environment 100, the roadway environment 166 or the flow process 155. For example, the communication module 202 receives or transmits, via the communication unit 145, one or more of the following elements: the remote GPS data 190; and the remote road parameter data 191. The communication module 202 may send or receive any of the data or messages described above with reference to FIG. 1A-1D via the communication unit 145.

In some embodiments, the communication module 202 receives data from components of the vehicle position system 199 and stores the data in one or more of the storage 241 and the memory 127. For example, the communication module 202 receives any of the data described above with reference to the memory 127 from the communication unit 145 (via the network 105, a DSRC message, a BSM, a DSRC probe, a full-duplex wireless message, etc.) and stores this data in the memory 127 (or temporarily in the storage 241 which may act as a buffer for the computer system 200).

In some embodiments, the communication module 202 may handle communications between components of the vehicle position system 199. For example, the communication module 202 may handle communications among the sensor module 204, the parameter module 206, the fusing module 208, the map generation module 210 and the control module 212. Any of these modules may cause the communication module 202 to communicate with the other elements of the computer system 200, the operating environment 100 (via the communication unit 145) or the roadway environment 166 (via the communication unit 145). For example, the sensor module 204 may use the communication module 202 to communicate with the sensor set 182 and cause the sensor set 182 to record sensor data.

In some embodiments, the communication module 202 receives a V2X wireless message from the network 105, and the V2X wireless message includes the remote GPS data and the remote road parameter data generated by the remote vehicle 124. For example, the V2X wireless message is selected from a group that consists of: a DSRC message; a BSM; an LTE message; an LTE-V2X message; a 5G-LTE message; and a millimeter wave message, etc. The communication module 202 retrieves the remote road parameter data and the remote GPS data from the V2X wireless message and sends the remote road parameter data and the remote GPS data to the fusing module 208 and the map generation module 210 respectively.

The sensor module 204 can be software including routines for using one or more of the sensors included in the sensor set 182 to generate sensor data. In some embodiments, the sensor module 204 can be stored in the memory 127 of the computer system 200 and can be accessible and executable by the processor 125. The sensor module 204 may be adapted for cooperation and communication with the processor 125 and other components of the computer system 200 via a signal line 224.

For example, the sensor module 204 may include code and routines that, when executed by the processor 125, cause the processor 125 to operate one or more of the sensors included in the sensor set 182 to record measurements of a physical environment proximate to the computer system 200 (e.g., the roadway environment 166 or the operating environment 100).

In some embodiments, the sensor module 204 may operate one or more sensors of the sensor set 182 to generate sensor data describing the measurements of the sensor set 182. The sensor module 204 may cause the sensor data to be stored in the memory 127.

In some embodiments, the sensor data may describe, for example, one or more of the following: GPS data related to the computer system 200 and other sensor data (e.g., image data) that is used to determine one or more road parameters. For example, if the computer system 200 is located in the ego vehicle 123, the sensor data includes the ego GPS data 192 and other sensor data used to generate the ego road parameter data 193. The generation of the ego road parameter data 193 is described below in more detail.

In some embodiments, the sensor module 204 may cause the GPS unit 170 to retrieve positional information for the computer system 200. For example, the computer system 200 is an element of the ego vehicle 123 and the sensor module 204 may cause the GPS unit 170 to retrieve the ego GPS data 191. The sensor module 204 may cause the communication module 202 to store the retrieved positional information in the memory 127. For example, the sensor module 204 may cause the communication module 202 to store the ego GPS data 191 in the memory 127.

The parameter module 206 can be software including routines that, when executed by the processor 125, cause the processor 125 to generate ego road parameter data. In some embodiments, the parameter module 206 can be a set of instructions stored in the memory 127 of the computer system 200 and can be accessible and executable by the processor 125. The parameter module 206 may be adapted for cooperation and communication with the processor 125 and other components of the computer system 200 via a signal line 281.

In some embodiments, the parameter module 206 retrieves sensor data recorded by one or more sensors from the sensor set 182 and generates ego road parameter data that describes one or more road parameters based on the sensor data. The one or more road parameters may include, but are not limited to, the following elements: a lateral offset of the ego vehicle 123; a relative heading of the ego vehicle 123; curvature of a lane on which the ego vehicle 123 is located; a curvature change rate of the lane; a total number of lanes in the roadway environment in each direction; and a slope of the roadway (e.g., uphill or downhill); etc.

For example, the sensor set 182 includes multiple cameras mounted on different locations of the ego vehicle 123 which capture images of the roadway environment in a predetermined interval. The parameter module 206 may determine one or more road parameters by performing image processing techniques on the images taken by the cameras, and then generate the ego road parameter data describing the one or more road parameters. For example, the parameter module 206 may perform object identification and recognition from an image taken by a camera using one or more image processing techniques (e.g., an image processing technique using a convolutional neural network) and identify that there are 3 lanes on the roadway in each direction and the slope of the roadway is uphill.

In some embodiments, the ego road parameter data (or, the one or more road parameters) describes an initial estimate of a geometry of a road on which the ego vehicle 123 is located. For example, the ego road parameter data includes data describing a curvature of the lane on which the ego vehicle 123 is located. From the curvature of the lane, it can tell that there is a sharp turn on the lane.

The fusing module 208 can be software including routines that, when executed by the processor 125, cause the processor 125 to fuse the remote road parameter data with the ego road parameter data to generate fused road parameter data. In some embodiments, the fusing module 208 can be stored in the memory 127 of the computer system 200 and can be accessible and executable by the processor 125. The fusing module 208 may be adapted for cooperation and communication with the processor 125 and other components of the computer system 200 via a signal line 226.

The fusing module 208 is operable to fuse the ego road parameter data generated by the ego vehicle 123 and the remote road parameter data received from the remote vehicle 124 to form fused road parameter data. In some embodiments, the fusing module 208 generates the fused road parameter data by performing Kalman filtering on the ego road parameter data and the remote road parameter data. For example, the fusing module 208 inputs the ego road parameter data and the remote road parameter data as inputs to a Kalman filter and generates the fused road parameter data as an output. In some other embodiments, the fusing module 208 may generate the fused road parameter data by performing other filtering techniques on the ego road parameter data and the remote road parameter data, where the other filtering techniques are operable to improve accuracy of a measurement for a variable using multiple other measurements of the same variable.

The fused road parameter data provides road parameter data that is more accurate than the ego road parameter data and the remote road parameter data. The fused road parameter data describes an improved estimate of the geometry of the road on which the ego vehicle 123 is located. The improved estimate of the geometry of the road is more accurate than the initial estimate of the geometry of the road provided by the ego road parameter data.

In some embodiments, the ego vehicle 123 (e.g., the parameter module 206 of the ego vehicle 123) may also estimate a position of the remote vehicle 124 based on sensor data recorded by its onboard sensors. For example, the ego vehicle 123 may estimate a position of the remote vehicle 124 by processing an image taken by an onboard camera, where the image captures the remote vehicle 124. The fusing module 208 may also fuse the remote GPS data with data describing the position of the remote vehicle 124 estimated by the ego vehicle 123 to form fused GPS data. The fused GPS data describes an estimate of the position of the remote vehicle 124 that is more accurate than the remote GPS data. For example, the fused GPS data describes an estimate of the position of the remote vehicle 124 that is accurate within plus or minus half of a lane width (e.g., ±1.5 meters). By comparison, in some examples, the remote GPS data generated by a conventional GPS unit is only accurate to within plus or minus 10 meters. Most roadway lanes are about 3 meters wide. As a result, the fused GPS data is capable of providing lane-level accuracy when describing the location of the remote vehicle 124, which can be used for improving accuracy of a vehicle-lane-change detection technique. For example, the fused GPS data can be used by the map generation module 210 to depict a position of the remote vehicle 124 on the map.

The map generation module 210 can be software including routines that, when executed by the processor 125, cause the processor 125 to generate a real-time HD map. In some embodiments, the map generation module 210 can be stored in the memory 127 of the computer system 200 and can be accessible and executable by the processor 125. The map generation module 210 may be adapted for cooperation and communication with the processor 125 and other components of the computer system 200 via a signal line 228.

In some embodiments, the map generation module 210 generates HD map data describing a real-time HD map based on the ego GPS data, the remote GPS data, and the fused road parameter data. The real-time HD map may depict a map of the roadway on which the ego vehicle 123 is located in real time. For example, the real-time HD map may depict one or more lanes on the road, the ego vehicle 123 located on one of the lanes, and one or more other vehicles (e.g., the remote vehicle 124) surrounding the ego vehicle 123. An example real-time HD map is provided in FIG. 7. In some embodiments, the real-time HD map provides an estimate of a position of the remote vehicle 124 with lane-level accuracy. For example, the real-time HD map provides an estimate of a position of the remote vehicle 124 that is accurate within plus or minus half a width of a lane (e.g., ±1.5 meters).

In some embodiments, the map generation module 210 may use path history data describing path history points from BSM messages that are generated by the remote vehicle 124 to build the real-time HD map for the ego vehicle 123. The map generation module 210 may generate interpolated path history points (referred to as "interpolated points" for simplicity) for the remote vehicle 124 based on the path history points from the BSM messages. The map generation module 210 may use lateral offsets from the remote road parameter data to estimate lateral offsets for the interpolated points to improve the map accuracy, so that a travel path of the remote vehicle 124 can be depicted more accurately on the map.

For example, the V2X wireless message received from the remote vehicle 124 further includes path history data describing multiple path history points of the remote vehicle 124, and the remote road parameter data includes a lateral offset of the remote vehicle 124 from a center of a reference lane on which the remote vehicle 124 is located. The map generation module 210 generates the HD map data describing the real-time HD map at least by: (1) generating one or more interpolated points based on the multiple path history points, where a lateral offset for each of the one or more interpolated points is estimated based on the lateral offset of the remote vehicle 124; and (2) generating a path of the remote vehicle 124 on the HD map based on the multiple path history points and the one or more interpolated points.

Specifically, for example, the map generation module 210 generates the interpolated points based on the path history points using one or more interpolation techniques such as a linear interpolation technique or a non-linear interpolation technique (e.g., a polynomial interpolation technique, a spline interpolation technique, etc.). The map generation module 210 estimates lateral offsets for the interpolated points based on lateral offsets of the path history points (e.g., examples of estimating lateral offsets for the interpolated points are described below with reference to FIGS. 6-7 respectively). The map generation module 210 connects the path history points and the interpolated points together in the map to form a travel path of the remote vehicle 124 on the map.

The control module 212 can be software including routines that, when executed by the processor 125, cause the processor 125 to input the HD map data to the vehicle control system 130 to improve performance of the vehicle control system 130. In some embodiments, the control module 212 can be stored in the memory 127 of the computer system 200 and can be accessible and executable by the processor 125. The control module 212 may be adapted for cooperation and communication with the processor 125 and other components of the computer system 200 via a signal line 230.

In some embodiments, the control module 212 inputs the HD map data to the vehicle control system 130 to improve accuracy of a vehicle tracking technique controlled by the vehicle control system 130 and causes the vehicle control system 130 to execute the vehicle tracking technique based on the HD map data to track movement of the remote vehicle 124. For example, the vehicle tracking technique is a vehicle-lane-change detection technique, the vehicle control system 130 executes the vehicle-lane-change detection technique to detect a lane change of the remote vehicle 124 based on the HD map data. An example of vehicle-lane-change detection is described below with reference to FIG. 7.

In some embodiments, the control module 212 is operable to input the HD map data to the vehicle control system 130 to modify an operation of the vehicle control system 130 based on the HD map data, so that the vehicle control system 130 controls the operation of the ego vehicle 123 based on the HD map data. For example, the vehicle control system 130 includes the ADAS system 180. Assume that the ego vehicle 123 is travelling on a first lane and the ADAS system 180 has issued a lane-change instruction to control the ego vehicle 123 to change to a second lane in the next 30 seconds so as to get ready for exit. However, because the real-time HD map depicts that the remote vehicle 124 is approaching the ego vehicle 123 on the second lane with an abnormal fast speed, the ADAS system 180 of the ego vehicle 123 may cancel the lane-change instruction immediately for safety considerations. The ADAS system 180 may reissue the lane-change instruction again when the HD map data is updated to indicate that the remote vehicle 124 has passed by the ego vehicle 123 and it is safe for the ego vehicle 123 to change to the second lane.

In some embodiments, the vehicle position system 199 of the remote vehicle 124 may provide functionality similar or identical to that of the vehicle position system 199 of the ego vehicle 123. The vehicle position system 199 of the remote vehicle 124 may also perform additional operations different from those of the ego vehicle 123.

For example, the vehicle position system 199 of the remote vehicle 124 may also include the communication module 202, the sensor module 204, the parameter module 206, the fusing module 208, the map generation module 210 and the control module 212. Similar description for these modules is not repeated here.

In some embodiments, the sensor module 204 of the remote vehicle 124 may operate one or more sensors of the remote vehicle 124 to generate sensor data including the remote GPS data 190 and other sensor data used to determine the remote road parameter data 191.

In some embodiments, the sensor module 204 of the remote vehicle 124 may cause the GPS unit 170 of the remote vehicle 124 to retrieve positional information for the remote vehicle 124. For example, the sensor module 204 of the remote vehicle 124 may cause the GPS unit 170 of the remote vehicle 124 to retrieve the remote GPS data 190.

In some embodiments, the parameter module 206 of the remote vehicle 124 retrieves sensor data recorded by one or more sensors from the sensor set 182 of the remote vehicle 124 and generates remote road parameter data that describes one or more road parameters based on the sensor data. The one or more road parameters may include, but are not limited to, the following elements: a lateral offset of the remote vehicle 14 from a center of a reference lane on which the remote vehicle 124 is located; a relative heading of the remote vehicle 124; curvature of the reference lane; a curvature change rate of the reference lane; a total number of lanes on the roadway in each direction; and a slope of the roadway (e.g., uphill or downhill); etc.

For example, the sensor set 182 of the remote vehicle 124 includes multiple cameras mounted on different locations of the remote vehicle 124 which take images of the roadway in a predetermined interval. The parameter module 206 of the remote vehicle 124 may determine one or more road parameters by performing image processing techniques on the images taken by the cameras and generate the remote road parameter data describing the one or more road parameters. For example, the parameter module 206 of the remote vehicle 124 may perform object identification and recognition on an image taken by a camera using one or more image processing techniques and output the lateral offset of the remote vehicle 124 as a processing result.

Example Processes

Figure 3:
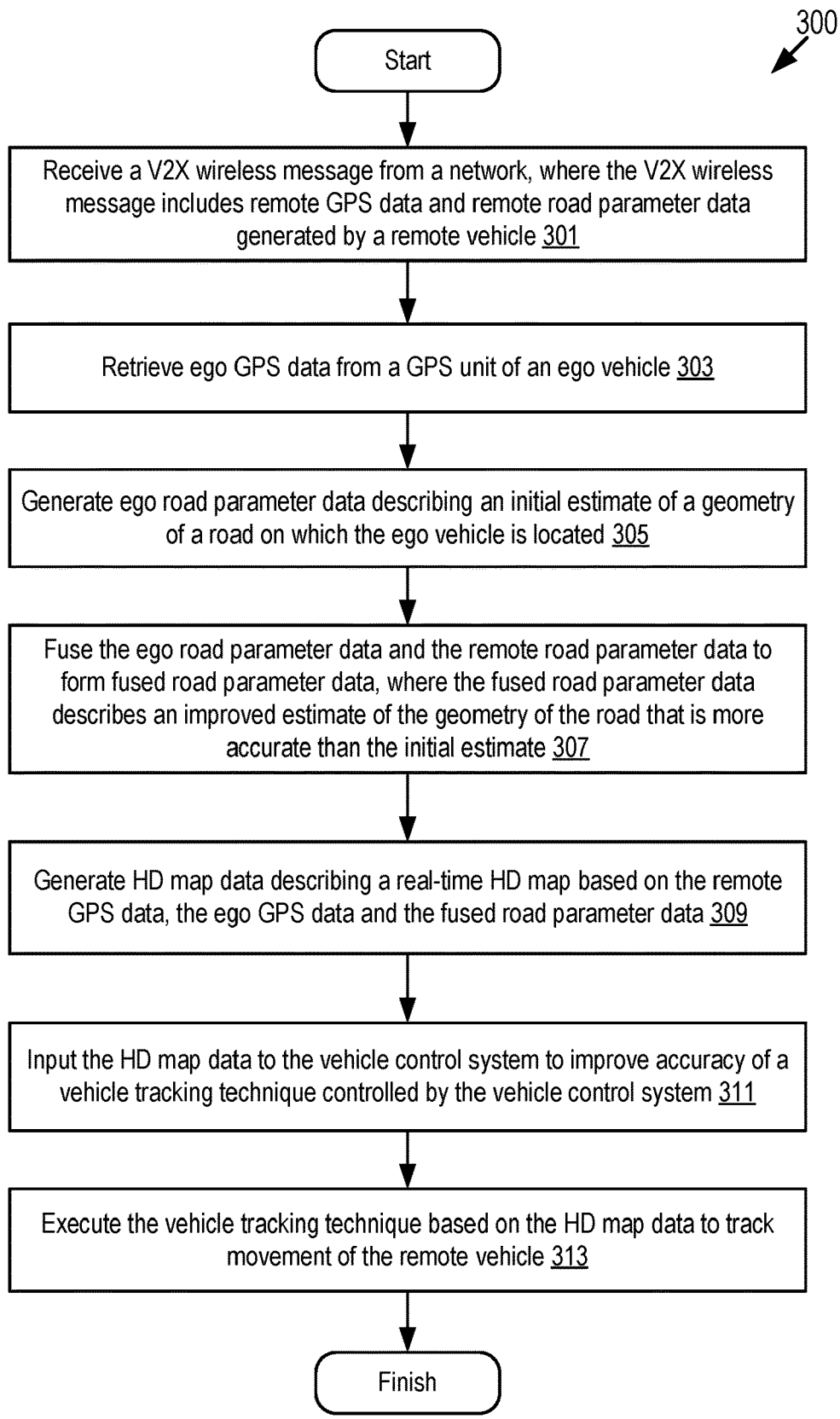
FIG. 3 depicts a method for generating a real-time HD map according to some embodiments.

Referring now to FIG. 3, depicted is a flowchart of an example method 300 for generating a real-time HD map on the ego vehicle 123 according to some embodiments. The steps of the method 300 are executable in any order, and not necessarily the order depicted in FIG. 3.

At step 301, the communication module 202 receives a V2X wireless message from a network. The V2X wireless message includes remote GPS data and remote road parameter data generated by the remote vehicle 124.

At step 303, the communication module 202 retrieves ego GPS data from the GPS unit 170 of the ego vehicle 123.

At step 305, the parameter module 206 generates ego road parameter data describing an initial estimate of a geometry of a road on which the ego vehicle 123 is located.

At step 307, the fusing module 208 fuses the ego road parameter data and the remote road parameter data to form fused road parameter data. The fused road parameter data describes an improved estimate of the geometry of the road that is more accurate than the initial estimate.

At step 309, the map generation module 210 generates HD map data describing a real-time HD map based on the remote GPS data, the ego GPS data, and the fused road parameter data.

At step 311, the control module 212 inputs the HD map data to the vehicle control system 130 to improve accuracy of a vehicle tracking technique controlled by the vehicle control system 130.

At step 313, the control module 212 causes the vehicle control system 130 to execute the vehicle tracking technique based on the HD map data to track movement of the remote vehicle 124.

Figure 4:
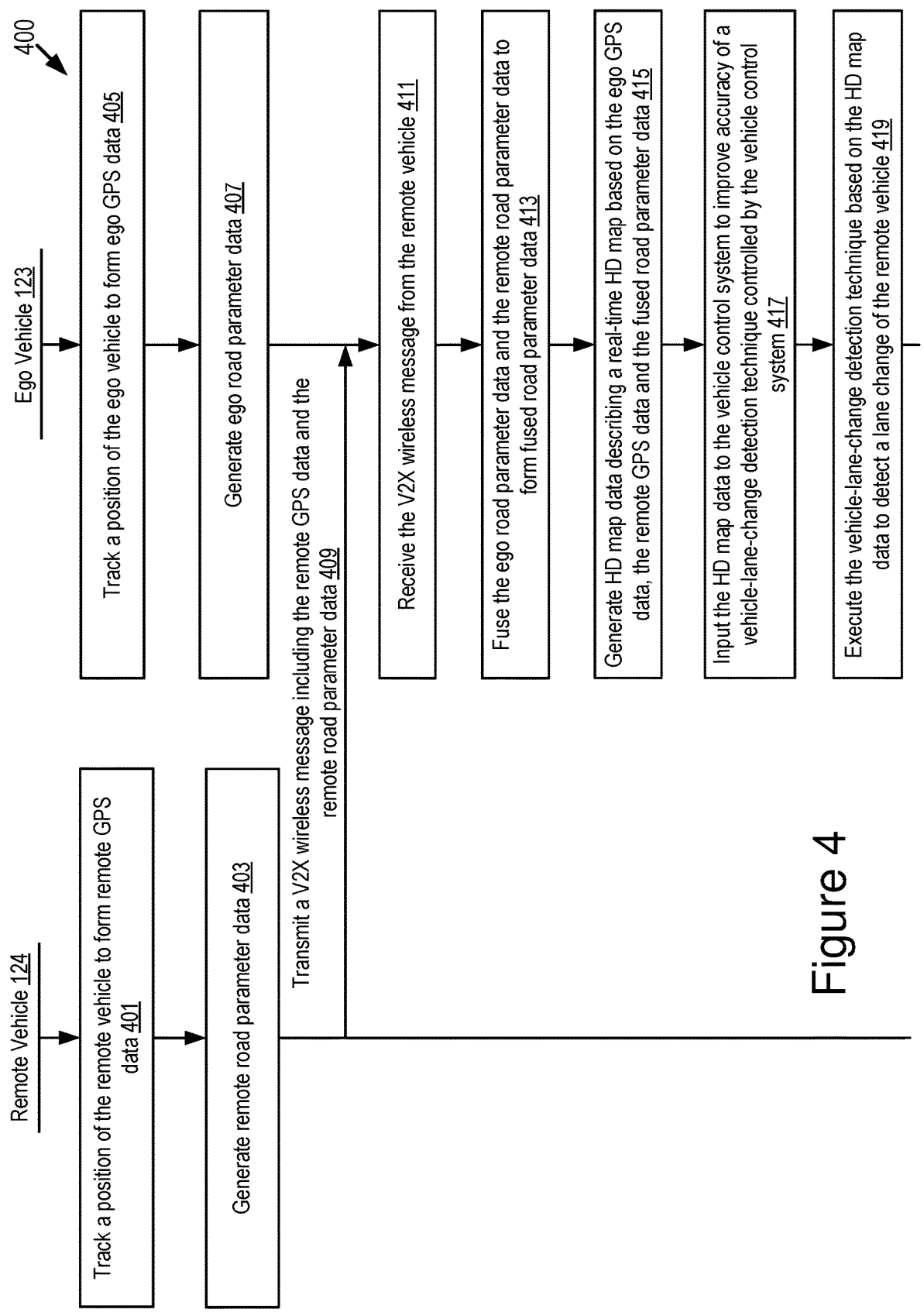
FIG. 4 depicts an example process for generating a real-time HD map according to some embodiments.

FIG. 4 depicts an example process 400 for generating a real-time HD map according to some embodiments. The steps of the process 400 are executable in any order, and not necessarily the order depicted in FIG. 4.

At step 401, the GPS unit 170 of the remote vehicle 124 tracks a position of the remote vehicle 124 to form remote GPS data.

At step 403, the parameter module 206 of the remote vehicle 124 generates remote road parameter data based on sensor data recorded by one or more sensors of the sensor set 182 on the remote vehicle 124.

At step 405, the GPS unit 170 of the ego vehicle 123 tracks a position of the ego vehicle 123 to form ego GPS data.

At step 407, the parameter module 206 of the ego vehicle 123 generates ego road parameter data based on sensor data recorded by one or more sensors of the sensor set 182 on the ego vehicle 123.

At step 409, the communication module 202 of the remote vehicle 124 transmits a V2X wireless message including the remote GPS data and the remote road parameter data to the ego vehicle 123 via the network 105.

At step 411, the communication module 202 of the ego vehicle 123 receives the V2X wireless message from the network 105.

At step 413, the fusing module 208 of the ego vehicle 123 fuses the ego road parameter data and the remote road parameter data to form fused road parameter data.

At step 415, the map generation module 210 of the ego vehicle 123 generates HD map data describing a real-time HD map based on the remote GPS data, the ego GPS data, and the fused road parameter data.

At step 417, the control module 212 of the ego vehicle 123 inputs the HD map data to the vehicle control system 130 of the ego vehicle 123 to improve accuracy of a vehicle-lane-change detection technique controlled by the vehicle control system 130.

At step 419, the vehicle control system 130 executes the vehicle-lane-change detection technique based on the HD map data to detect a lane change of the remote vehicle 124.

In some embodiments, the parameter module 206 of the ego vehicle 123 may also estimate a position of the remote vehicle 124 based on sensor data recorded by its onboard sensors. For example, the ego vehicle 123 may estimate a position of the remote vehicle 124 by processing an image taken by an onboard camera, where the image captures the remote vehicle 124. The fusing module 208 may also fuse the remote GPS data with data describing the position of the remote vehicle 124 estimated by the ego vehicle 123 to form fused GPS data. For example, the fusing module 208 uses the remote GPS data and the data describing the position of the remote vehicle 124 estimated by the ego vehicle 123 as inputs to a Kalman filter, and outputs the fused GPS data as an output. The fused GPS data describes an estimate of the position of the remote vehicle 124 that is more accurate than the remote GPS data. The map generation module 210 generates a real-time HD map based on the ego GPS data, the fused GPS data, and the fused road parameter data.

Figure 5:
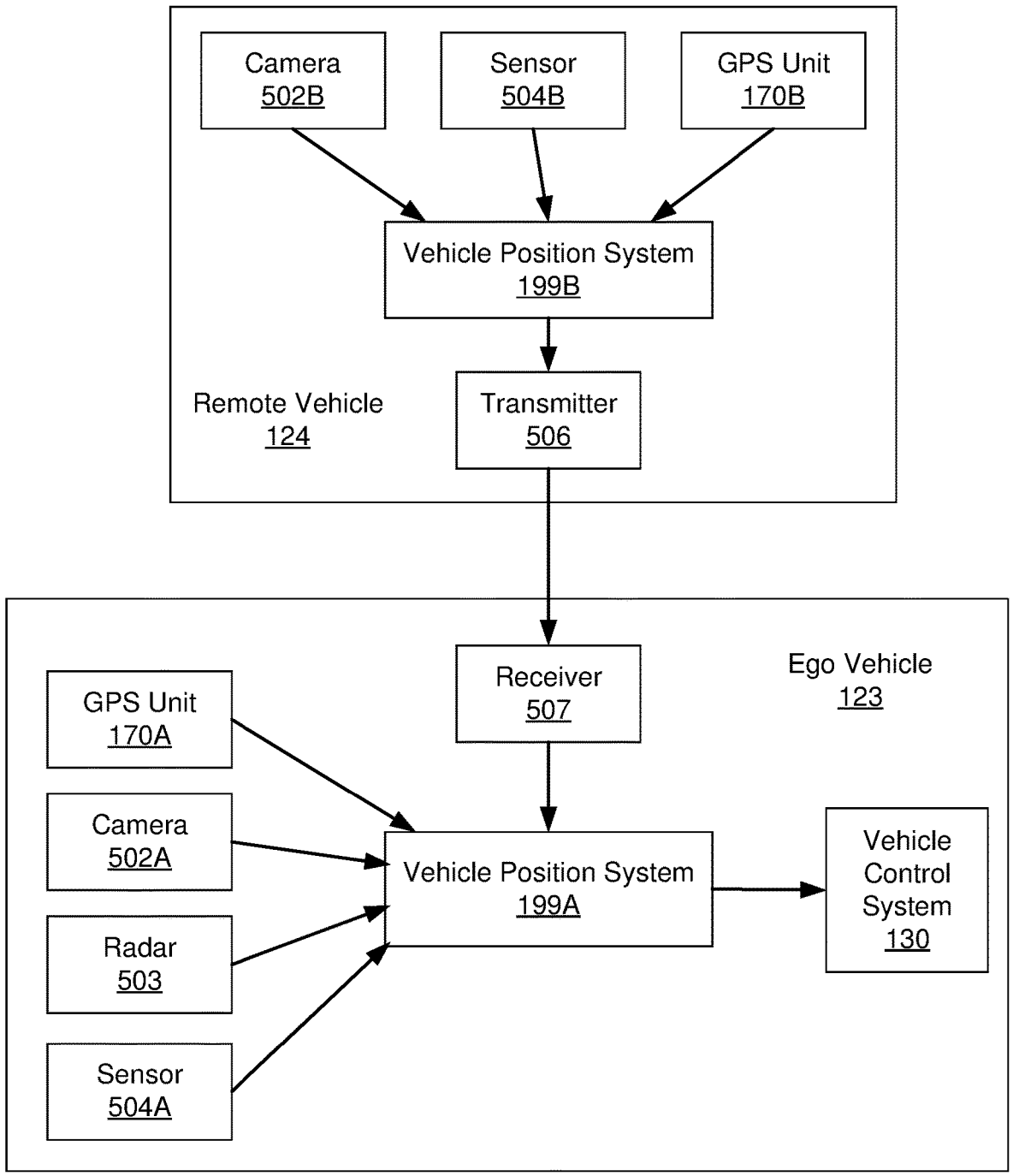
FIG. 5 is a block diagram illustrating a system architecture including a vehicle position system in each vehicle according to some embodiments.

FIG. 5 is a block diagram illustrating a system architecture 500 including the vehicle position system 199A in the ego vehicle 123 and the vehicle position system 199B in the remote vehicle 124 according to some embodiments.

A roadway environment includes the ego vehicle 123 and the remote vehicle 124. The remote vehicle 124 includes a camera 502B for capturing images of the roadway environment and inputting image data describing the captured images to the vehicle position system 199B. The vehicle position system 199B processes the image data using one or more image processing techniques to generate remote road parameter data that includes one or more of a lateral offset of the remote vehicle 124, a relative heading of the remote vehicle 124, curvature of a road on which the remote vehicle 124 is located, and a curvature change rate of the road, etc.

The remote vehicle 124 may include one or more other sensors 504B for recording other sensor data. In some embodiments, the other sensor data may also be used by the vehicle position system 199B to generate the remote road parameter data.

The GPS unit 170B of the remote vehicle 124 tracks a position of the remote vehicle 124 to generate remote GPS data, and inputs the remote GPS data to the vehicle position system 199B.

The vehicle position system 199B generates a V2X wireless message including the remote GPS data and the remote road parameter data and forwards the V2X wireless message to a transmitter 506. The transmitter 506 transmits the V2X wireless message to the ego vehicle 123 via V2X communication.

A receiver 507 of the ego vehicle 123 receives the V2X wireless message and inputs the V2X wireless message to the vehicle position system 199A.

A camera 502A of the ego vehicle 123 captures images of the roadway environment and inputs image data describing the captured images to the vehicle position system 199A. The vehicle position system 199A processes the image data using one or more image processing techniques to generate ego road parameter data.

A radar 503 and one or more other sensors 504A can also record other sensor data. In some embodiments, the other sensor data may also be used by the vehicle position system 199A to generate the ego road parameter data.

The GPS unit 170A of the ego vehicle 123 tracks a position of the ego vehicle 123 to generate ego GPS data and inputs the ego GPS data to the vehicle position system 199A.

The vehicle position system 199A generates fused road parameter data using a Kalman filtering technique or another appropriate filtering technique based on the ego road parameter data and the remote road parameter data. The vehicle position system 199A generates HD map data describing a real-time HD map based on the ego GPS data, the remote GPS data, and the fused road parameter data. The vehicle position system 199A inputs the HD map data to the vehicle control system 130 to modify an operation of the vehicle control system 130, so that the vehicle control system 130 controls an operation of the ego vehicle 123 based on the HD map data.

Figure 6:
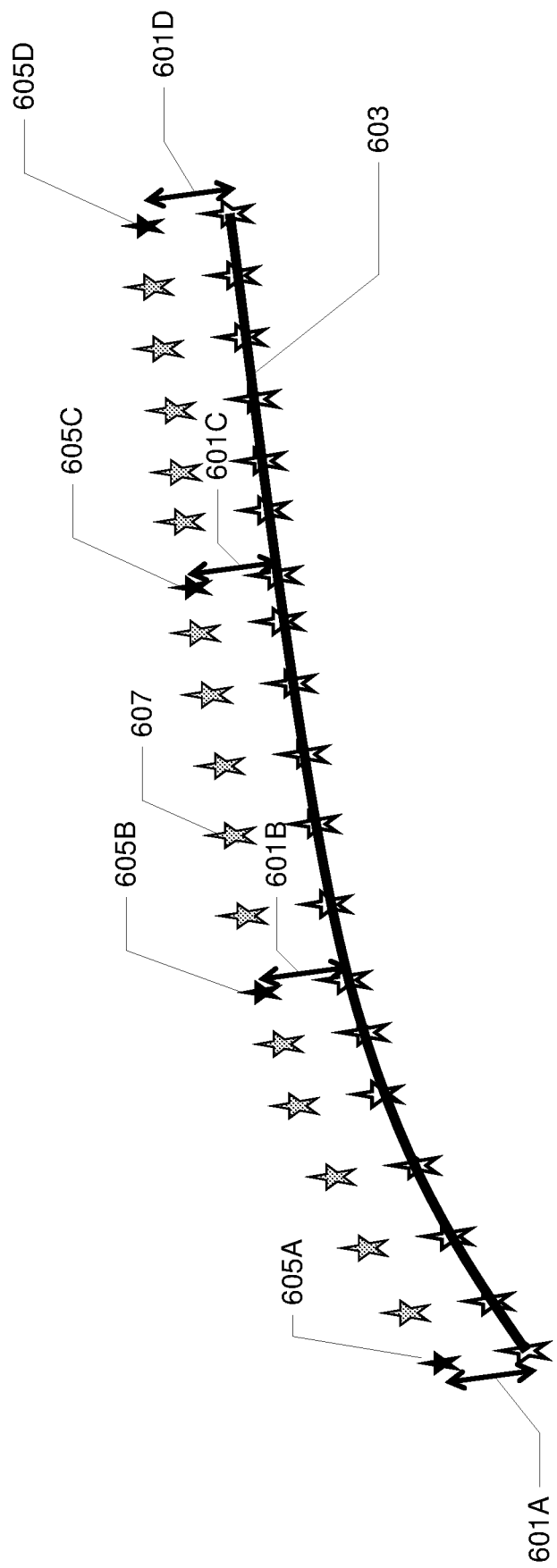
FIG. 6 is a graphical representation illustrating an example travel path of a remote vehicle including path history points and interpolated points according to some embodiments.

FIG. 6 is a graphical representation illustrating an example travel path of the remote vehicle 124 according to some embodiments. In this example, from a V2X wireless message (e.g., a BSM message) received from the remote vehicle 124, the map generation module 210 retrieves four path history points 605A, 605B, 605C and 605D and four lateral offsets 601A, 601B, 601C and 601D between the four path history points 605A, 605B, 605C and 605D and a center line 603 of the road respectively.

The map generation module 210 generates five interpolated points 607 between each two adjacent path history points using one or more interpolation techniques such as a linear interpolation technique. A lateral offset for each of the five interpolated points 607 is determined based on the lateral offsets of the two adjacent path history points. For example, if the two adjacent path history points 605B and 605C have a same lateral offset (the lateral offset 601B=the lateral offset 601C), then the five interpolated points 607 between the two adjacent path history points 605B and 605C may have the same lateral offset as the two adjacent path history points 605B and 605C. If the lateral offset 601B of the path history point 605B is greater than the lateral offset 601C of the path history point 605C, then the five interpolated points 607 from the path history point 605B to the path history point 605C may have lateral offsets that are gradually reduced from the lateral offset 601B to the lateral offset 601C. Other ways to determine lateral offsets for the interpolated points 607 are also possible.

The map generation module 210 generates a travel path of the remote vehicle 124 by connecting the path history points 605A-605D and the interpolated points 607 together.

In some embodiments, BSM messages received from the remote vehicle 124 include a path history of the remote vehicle 124. The path history includes up to 15 path history points for every 210 meters (m). The map generation module 210 may generate interpolated points based on the path history points to further improve the road geometry estimation. For example, if an average speed of a vehicle is 30 m/s and a BSM rate is 10 Hz, the map generation module 210 may use path history interpolation to generate up to 70 points (each point including a position and a relative heading) for every 210 m. The map generation module 210 may use data describing the lateral offset generated by an onboard camera in the remote vehicle 124 to determine a lateral offset for each interpolated point. This results in improved map accuracy. For example, the interpolated points may further improve the road geometry estimation.

Figure 7:
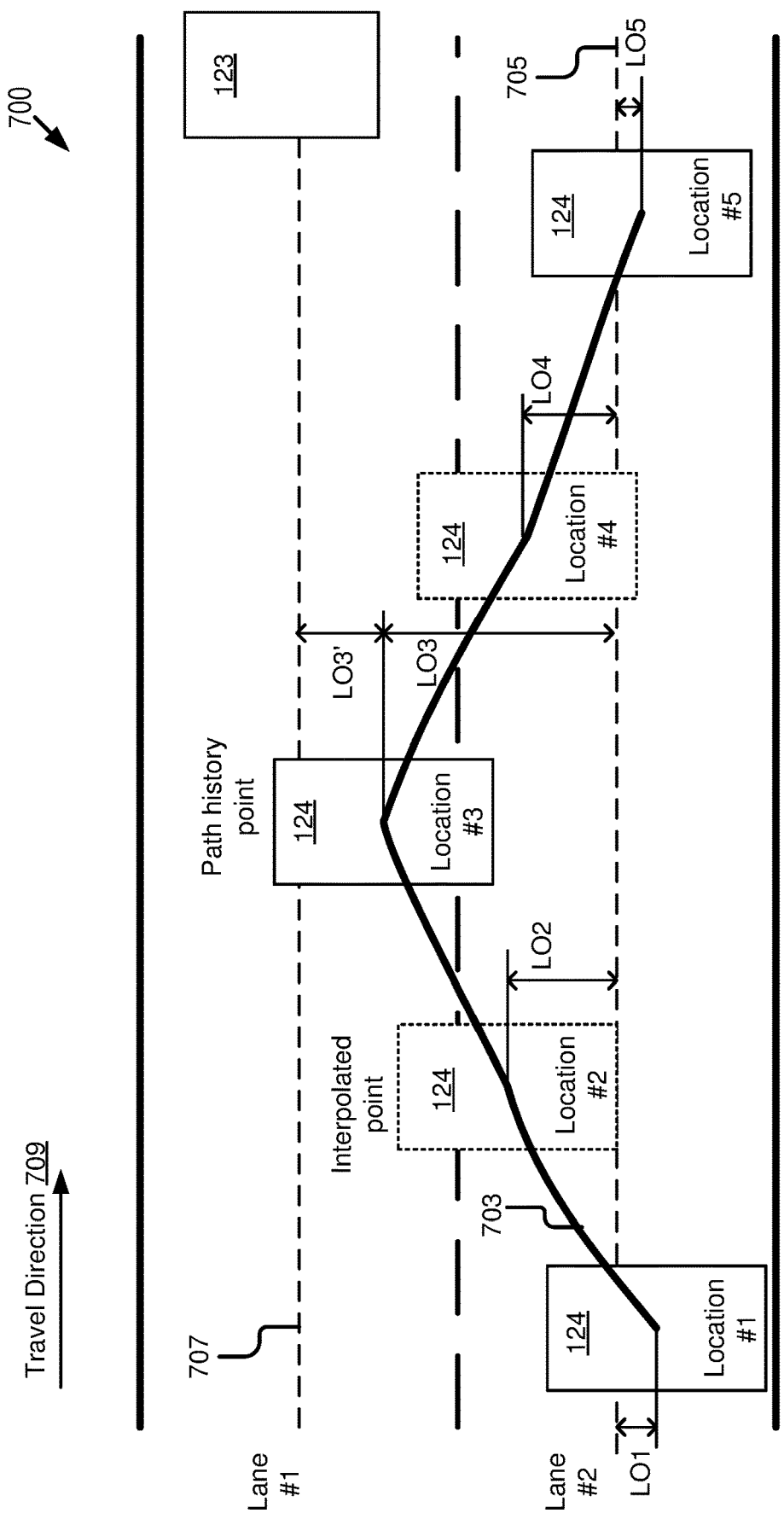
FIG. 7 is a graphical representation illustrating an example real-time HD map according to some embodiments.

FIG. 7 is a graphical representation illustrating an example real-time HD map 700 generated on the ego vehicle 123 according to some embodiments. The HD map 700 only shows two lanes (Lane #1 with a center line 707 and Lane #2 with a center line 705) in a travel direction 709 by way of examples. Different numbers of lanes are also possible. The ego vehicle 123 travels on Lane #1, while initially the remote vehicle 124 travels on Lane #2.

The remote vehicle 124 records a first set of remote GPS data and remote road parameter data (including a lateral offset LO1) for Location #1, a second set of remote GPS data and remote road parameter data (including a lateral offset LO3 or a lateral offset LO3') for Location #3 and a third set of remote GPS data and remote road parameter data (including a lateral offset LO5) for Location #5. The first, second and third sets of remote GPS data and remote road parameter data are transmitted to the ego vehicle 123 in a form of V2X wireless messages via V2X communication, respectively.

By taking Lane #2 as a reference lane, the lateral offset LO1 is a distance between a reference point (e.g., a center point) of the remote vehicle 124 and the center line 705 of Lane #2 at Location #1. Since the reference point of the remote vehicle 124 at Location #1 is below the center line 705, the lateral offset LO1 may have a negative value.

By taking Lane #2 as the reference lane, the lateral offset LO3 is a distance between the reference point of the remote vehicle 124 and the center line 705 of Lane #2 at Location #3. Since the reference point of the remote vehicle 124 at Location #3 is above the center line 705, the lateral offset LO3 may have a positive value. Alternatively, by taking Lane #1 as a reference lane, the lateral offset LO3' is a distance between the reference point of the remote vehicle 124 and the center line 707 of Lane #1 at Location #3. That is, the lateral offset at Location #3 may be described by the lateral offset LO3 by taking Lane #2 as the reference lane or the lateral offset LO3' by taking Lane #1 as the reference lane.

By taking Lane #2 as the reference lane, the lateral offset LO5 is a distance between the reference point of the remote vehicle 124 and the center line 705 of Lane #2 at Location #5. Since the reference point of the remote vehicle 124 at Location #5 is below the center line 705, the lateral offset LO5 may have a negative value.

As shown in FIG. 7, a first interpolated point is estimated using an interpolation technique and inserted at Location #2 between Location #1 and Location #3, where the first interpolated point has a lateral offset LO2 by taking Lane #2 as a reference lane. For example, the lateral offset LO2 can be half of a difference between the lateral offset LO3 at Location #3 and the lateral offset LO1 at Location #1 (e.g., LO2=(LO3−LO1)/2). A horizontal position of the first interpolated point along the travel direction 709 can be half of a difference between a horizontal position of Location #3 and a horizontal position of Location #1 along the travel direction 709. For example, the horizontal position of the first interpolated point along the travel direction 709=(the horizontal position of Location #3—the horizontal position of Location #1)/2. As a result, Location #2 can be expressed by the combination of the lateral offset LO2 along a vertical direction and the horizontal position of the first interpolated point along the travel direction 709.

A second interpolated point is estimated and inserted at Location #4 between Location #3 and Location #5, where the second interpolated point has a lateral offset LO4 by taking Lane #2 as a reference lane. For example, the lateral offset LO4 can be half of a difference between the lateral offset LO5 at Location #5 and the lateral offset LO3 at Location #3 (e.g., LO4=(LO5−LO3)/2). A horizontal position of the second interpolated point along the travel direction 709 can be half of a difference between a horizontal position of Location #5 and a horizontal position of Location #3 along the travel direction 709. For example, the horizontal position of the second interpolated point along the travel direction 709=(the horizontal position of Location #5—the horizontal position of Location #3)/2. As a result, Location #4 can be expressed by the combination of the lateral offset LO4 along the vertical direction and the horizontal position of the second interpolated point along the travel direction 709.

A travel path 703 of the remote vehicle 124 is depicted based on the path history points at Location #1, Location #3, and Location #5 (depicted as solid rectangles with the reference numeral 124) and the interpolated points at Location #2 and Location #4 (depicted as dotted rectangles with the reference numeral 124). Since the travel path 703 changes to Lane #1 from Lane #2 and moves back to Lane #2 again, the ego vehicle 123 can detect a lane change of the remote vehicle 124.

Referring now to FIG. 8A, depicted is a block diagram illustrating an example of the BSM data 800 according to some embodiments. A regular interval for transmitting BSMs may be user configurable. In some embodiments, a default setting for this interval may be transmitting the BSM every 0.10 seconds or substantially every 0.10 seconds.

A BSM may be broadcasted over the 5.9 GHz DSRC band. DSRC range may be substantially 1,000 meters. In some embodiments, DSRC range may include a range of substantially 100 meters to substantially 1,000 meters.

Referring now to FIG. 8B, depicted is a block diagram illustrating an example of BSM data 800 according to some embodiments.

A BSM may include two parts. These two parts may include different BSM data 800 as shown in FIG. 8B. Part 1 of the BSM data 800 may describe one or more of the following: a vehicle position; a vehicle heading; a vehicle speed; a vehicle acceleration; a vehicle steering wheel angle; and a vehicle size.

Part 2 of the BSM data 800 may include a variable set of data elements drawn from a list of optional elements. Some of the BSM data 800 included in Part 2 of the BSM are selected based on event triggers, e.g., anti-locking brake system ("ABS") being activated may trigger BSM data 800 relevant to the ABS system of the vehicle. In some embodiments, some of the elements of Part 2 are transmitted less frequently in order to conserve bandwidth.

In some embodiments, the BSM data 800 included in a BSM includes current snapshots of a vehicle traveling along a roadway system.

In some embodiments, some or all of the information described above for the BSM data 800 may be included in a DSRC message or a BSM.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method for an ego vehicle including a Global Positioning System (GPS) unit, comprising:
   receiving a Vehicle-to-Anything (V2X) wireless message from a network, wherein the V2X wireless message includes remote GPS data, remote road parameter data, and path history data describing path history points of a remote vehicle generated by the remote vehicle;
   retrieving ego GPS data from the GPS unit of the ego vehicle;
   generating ego road parameter data describing an initial estimate of a geometry of a road on which the ego vehicle is located;
   fusing the ego road parameter data and the remote road parameter data to form fused road parameter data; and
   generating high-definition (HD) map data describing a real-time HD map based on the remote GPS data, the ego GPS data, the path history data, and the fused road parameter data by:
      generating one or more interpolated points based on the path history points; and
      generating a path of the remote vehicle on the real-time HD map based on the path history points and the one or more interpolated points.

2. The method of claim 1, wherein the ego vehicle further includes a vehicle control system and the method further comprises:
   inputting the HD map data to the vehicle control system to improve accuracy of a vehicle tracking technique controlled by the vehicle control system; and
   executing the vehicle tracking technique based on the HD map data to track movement of the remote vehicle.

3. The method of claim 2, wherein the vehicle tracking technique is a vehicle-lane-change detection technique, and executing the vehicle tracking technique based on the HD map data comprises:
   executing the vehicle-lane-change detection technique to detect a lane change of the remote vehicle based on the HD map data.

4. The method of claim 2, wherein inputting the HD map data to the vehicle control system includes modifying an operation of the vehicle control system based on the HD map data so that the vehicle control system controls an operation of the ego vehicle based on the HD map data.

5. The method of claim 2, wherein the vehicle control system includes one of an Advanced Driver Assistance System (ADAS system) or an autonomous driving system.

6. The method of claim 1, wherein:
the remote road parameter data includes a lateral offset of the remote vehicle from a center of a reference lane; and
a lateral offset for each of the one or more interpolated points is estimated based on the lateral offset of the remote vehicle.

7. The method of claim 6, wherein the remote road parameter data further includes one or more of a relative heading of the remote vehicle, curvature of the reference lane, or a curvature change rate of the reference lane.

8. The method of claim 1, wherein the real-time HD map provides an estimate of a position of the remote vehicle that is accurate within plus or minus half a width of a lane on the road.

9. The method of claim 1, wherein the remote GPS data describes a geographical location of the remote vehicle, and the ego GPS data describes a geographical location of the ego vehicle.

10. The method of claim 1, wherein the fusing is achieved by Kalman filtering.

11. The method of claim 1, wherein the V2X wireless message is selected from a group that consists of: a Basic Safety Message; a Long-Term Evolution (LTE) message; a LTE-V2X message; a 5G-LTE message; or a millimeter wave message.

12. A system comprising:
a Global Positioning System (GPS) unit of an ego vehicle; and
an onboard vehicle computer system that is communicatively coupled to the GPS unit, the onboard vehicle computer system including a non-transitory memory storing computer code which, when executed by the onboard vehicle computer system, causes the onboard vehicle computer system to:
receive a Vehicle-to-Anything (V2X) wireless message from a network, wherein the V2X wireless message includes remote GPS data, remote road parameter data, and path history data describing path history points of a remote vehicle generated by a remote vehicle;
retrieve ego GPS data from the GPS unit of the ego vehicle;
generate ego road parameter data describing an initial estimate of a geometry of a road on which the ego vehicle is located;
fuse the ego road parameter data and the remote road parameter data to form fused road parameter data; and
generate high-definition (HD) map data describing a real-time HD map based on the remote GPS data, the ego GPS data, the path history data, and the fused road parameter data by:
generating one or more interpolated points based on the path history points; and
generating a path of the remote vehicle on the real-time HD map based on the path history points and the one or more interpolated points.

13. The system of claim 12, wherein the system further includes a vehicle control system and the computer code which, when executed by the onboard vehicle computer system, causes the onboard vehicle computer system further to:
input the HD map data to the vehicle control system to improve accuracy of a vehicle tracking technique controlled by the vehicle control system; and
execute the vehicle tracking technique based on the HD map data to track movement of the remote vehicle.

14. The system of claim 13, wherein the computer code which, when executed by the onboard vehicle computer system, causes the onboard vehicle computer system further to:
input the HD map data to the vehicle control system for modifying an operation of the vehicle control system based on the HD map data so that the vehicle control system controls an operation of the ego vehicle based on the HD map data.

15. The system of claim 13, wherein the vehicle control system includes one of an Advanced Driver Assistance System (ADAS system) or an autonomous driving system.

16. The system of claim 12, wherein:
the remote road parameter data includes a lateral offset of the remote vehicle from a center of a reference lane; and
a lateral offset for each of the one or more interpolated points is estimated based on the lateral offset of the remote vehicle.

17. The system of claim 16, wherein the remote road parameter data further includes one or more of a relative heading of the remote vehicle, curvature of the reference lanes a curvature change rate of the reference lane.

18. A computer program product comprising a non-transitory memory of an onboard vehicle computer system of an ego vehicle storing computer-executable code that, when executed by a processor, causes the processor to:
receive a Vehicle-to-Anything (V2X) wireless message from a network, wherein the V2X wireless message includes remote GPS data, remote road parameter data, and path history data describing path history points of a remote vehicle generated by the remote vehicle;
retrieve ego GPS data from a GPS unit of the ego vehicle;
generate ego road parameter data describing an initial estimate of a geometry of a road on which the ego vehicle is located;
fuse the ego road parameter data and the remote road parameter data to form fused road parameter data; and
generate high-definition (HD) map data describing a real-time HD map based on the remote GPS data, the ego GPS data, the path history data, and the fused road parameter data by:
generating one or more interpolated points based on the path history points; and
generating a path of the remote vehicle on the real-time HD map based on the path history points and the one or more interpolated points.

19. The computer program product of claim 18, wherein the computer-executable code that, when executed by the processor, causes the processor further to:
input the HD map data to a vehicle control system to improve accuracy of a vehicle tracking technique controlled by the vehicle control system; and
execute the vehicle tracking technique based on the HD map data to track movement of the remote vehicle.

20. The computer program product of claim 18, wherein the computer-executable code that, when executed by the processor, causes the processor further to:
  input the HD map data to a vehicle control system for modifying an operation of the vehicle control system based on the HD map data so that the vehicle control system controls an operation of the ego vehicle based on the HD map data.

\* \* \* \* \*